(12) United States Patent
Hayashi et al.

(10) Patent No.: US 10,078,217 B2
(45) Date of Patent: Sep. 18, 2018

(54) IMAGE DISPLAY DEVICE AND APPARATUS

(71) Applicants: Yuki Hayashi, Kanagawa (JP); Naoki Nakamura, Saitama (JP); Daisuke Ichii, Kanagawa (JP); Hiromichi Atsuumi, Kanagawa (JP); Naoki Miyatake, Kanagawa (JP)

(72) Inventors: Yuki Hayashi, Kanagawa (JP); Naoki Nakamura, Saitama (JP); Daisuke Ichii, Kanagawa (JP); Hiromichi Atsuumi, Kanagawa (JP); Naoki Miyatake, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 160 days.

(21) Appl. No.: 14/885,246

(22) Filed: Oct. 16, 2015

(65) Prior Publication Data

US 2016/0116735 A1    Apr. 28, 2016

(30) Foreign Application Priority Data

Oct. 24, 2014 (JP) .................................. 2014-217054
Jan. 15, 2015 (JP) .................................. 2015-005537
Feb. 9, 2015 (JP) .................................. 2015-022793

(51) Int. Cl.
  *G02B 27/01* (2006.01)
  *G02B 3/00* (2006.01)

(52) U.S. Cl.
  CPC ....... *G02B 27/0101* (2013.01); *G02B 3/0006* (2013.01); *G02B 2027/011* (2013.01);
(Continued)

(58) Field of Classification Search
  CPC ............ G02B 27/0093; G02B 27/0101; G02B 27/017; G02B 27/0172; G02B 2027/01;
(Continued)

(56) References Cited

U.S. PATENT DOCUMENTS

| 5,497,170 A * | 3/1996 | Kato | ......................... G02B 5/32 340/980 |
| 6,266,194 B1 * | 7/2001 | Tanijiri | .............. G02B 27/0172 359/630 |

(Continued)

FOREIGN PATENT DOCUMENTS

| JP | 2004-020605 | 1/2004 |
| JP | 2013-025205 | 2/2013 |

(Continued)

OTHER PUBLICATIONS

Extended European Search Report dated Mar. 1, 2016 in Patent Application No. 15190458.8.
(Continued)

*Primary Examiner* — Loha Ben
(74) *Attorney, Agent, or Firm* — Oblon, McClelland, Maier & Neustadt, L.L.P.

(57) ABSTRACT

An image display device includes an image forming unit configured to emit light forming an image; and a concave mirror configured to reflect the light emitted from the image forming unit toward a transparent reflecting member. The image forming unit includes a transparent member on which the image is formed or which forms the image, the transparent member being curved bulging toward the concave mirror.

20 Claims, 36 Drawing Sheets

(52) U.S. Cl.
CPC ............ *G02B 2027/013* (2013.01); *G02B 2027/0118* (2013.01); *G02B 2027/0145* (2013.01)

(58) Field of Classification Search
CPC ...... G02B 2027/011; G02B 2027/0118; G02B 2027/0125; G02B 2027/013; G02B 2027/0138; G02B 2027/0145; H04N 5/44504; H04N 13/044; B60R 1/008; B60R 2300/107; B60K 35/00; B60K 2350/2052
USPC .................................. 359/629–632; 345/7–9
See application file for complete search history.

(56) References Cited

U.S. PATENT DOCUMENTS

| | | | | |
|---|---|---|---|---|
| 6,886,971 | B2* | 5/2005 | Abel | B60K 35/00 362/135 |
| 6,989,934 | B2* | 1/2006 | Aoki | B60K 35/00 345/7 |
| 8,766,879 | B2 | 7/2014 | Fujikawa et al. | |
| 9,507,152 | B2* | 11/2016 | Kasahara | G02B 27/0101 |
| 2003/0214724 | A1 | 11/2003 | Fujikawa et al. | |
| 2006/0285187 | A1 | 12/2006 | Ichii et al. | |
| 2007/0103747 | A1 | 5/2007 | Powell et al. | |
| 2007/0211324 | A1 | 9/2007 | Sakai et al. | |
| 2007/0211325 | A1 | 9/2007 | Ichii | |
| 2008/0068693 | A1 | 3/2008 | Hayashi et al. | |
| 2008/0100895 | A1 | 5/2008 | Hayashi et al. | |
| 2008/0238814 | A1 | 10/2008 | Ishikawa et al. | |
| 2009/0002792 | A1 | 1/2009 | Sakai et al. | |
| 2009/0060582 | A1 | 3/2009 | Ichii et al. | |
| 2009/0160736 | A1 | 6/2009 | Shikita | |
| 2009/0175657 | A1 | 7/2009 | Yoshii et al. | |
| 2009/0195849 | A1 | 8/2009 | Ichii et al. | |
| 2009/0295900 | A1 | 12/2009 | Ichii | |
| 2009/0315967 | A1 | 12/2009 | Hayashi et al. | |
| 2010/0195681 | A1 | 8/2010 | Tatsuno et al. | |
| 2011/0221857 | A1 | 9/2011 | Tatsuno et al. | |
| 2012/0044315 | A1 | 2/2012 | Shibayama et al. | |
| 2013/0021224 | A1 | 1/2013 | Fujikawa et al. | |
| 2013/0063754 | A1 | 3/2013 | Saisho et al. | |
| 2013/0127973 | A1 | 5/2013 | Ichii | |
| 2014/0133002 | A1 | 5/2014 | Tatsuno et al. | |
| 2014/0177022 | A1 | 6/2014 | Saisho et al. | |

FOREIGN PATENT DOCUMENTS

| | | |
|---|---|---|
| JP | 2013-061554 | 4/2013 |
| JP | 5370427 | 9/2013 |
| JP | 2014-139656 | 7/2014 |
| WO | WO 2014/059552 A1 | 4/2014 |

OTHER PUBLICATIONS

European Office Action dated May 24, 2018 in European Application No. 15 190 458.8, 5 pages.

* cited by examiner (A)

(B)

(A)

(B)

(A)

(B)

(A)

ECCENTRICALLY INCIDENT ON
CURVED SCREEN (B)

ECCENTRICALLY INCIDENT ON
FLAT SCREEN (C)

NON-ECCENTRICALLY
INCIDENT ON CURVED SCREEN (D)

NON-ECCENTRICALLY
INCIDENT ON FLAT SCREEN (A)

(B)

(A)

INTERMEDIATE IMAGE
(x-y CROSS SECTION)

(B)

INTERMEDIATE IMAGE
(y-w CROSS SECTION)

(C)

CURVATURE RADIUS R

INTERMEDIATE IMAGE
(x-w CROSS SECTION)

(A)

INTERMEDIATE IMAGE (x-y CROSS SECTION)

(B)

CURVATURE RADIUS R'

INTERMEDIATE IMAGE (y-w CROSS SECTION)

(C)

CURVATURE RADIUS R

INTERMEDIATE IMAGE (x-w CROSS SECTION)

(A)

(B)

(C)

(A)

INTERMEDIATE IMAGE
(x-y CROSS SECTION)

(B)

INTERMEDIATE IMAGE
(y-w CROSS SECTION)

(C)

INTERMEDIATE IMAGE
(x-w CROSS SECTION)

EXAMPLE 12

EXAMPLE 13

EXAMPLE 15

IMAGE DISPLAY DEVICE AND APPARATUS

CROSS-REFERENCE TO RELATED APPLICATIONS

The present application claims priority to and incorporates by reference the entire contents of Japanese Patent Application No. 2014-217054 filed in Japan on Oct. 24, 2014, Japanese Patent Application No. 2015-005537 filed in Japan on Jan. 15, 2015 and Japanese Patent Application No. 2015-022793 filed in Japan on Feb. 9, 2015.

BACKGROUND OF THE INVENTION

1. Field of the Invention

The present invention relates generally to an image display device and an apparatus including the image display device.

2. Description of the Related Art

Head-up display devices (image display devices) that enable an operator of a vehicle to view a virtual image through a windshield (transparent reflecting member) of the vehicle are conventionally known. An example of such a head-up display device is disclosed in Japanese Patent No. 5370427.

However, it is difficult with the head-up display device disclosed in Japanese Patent No. 5370427 to increase visibility of the virtual image without upsizing the device.

SUMMARY OF THE INVENTION

It is an object of the present invention to at least partially solve the problems in the conventional technology.

According to an embodiment, there is provided an image display device that includes an image forming unit configured to emit light forming an image; and a concave mirror configured to reflect the light emitted from the image forming unit toward a transparent reflecting member. The image forming unit includes a transparent member on which the image is formed or which forms the image, the transparent member being curved bulging toward the concave mirror.

According to another embodiment, there is provided an image display device that includes an image forming unit configured to emit light forming an image; and a concave mirror configured to reflect the light emitted from the image forming unit toward a transparent reflecting member. Light forming center of the image impinges on the concave mirror at a position other than center of the concave mirror.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment is described below.

Figure 1:
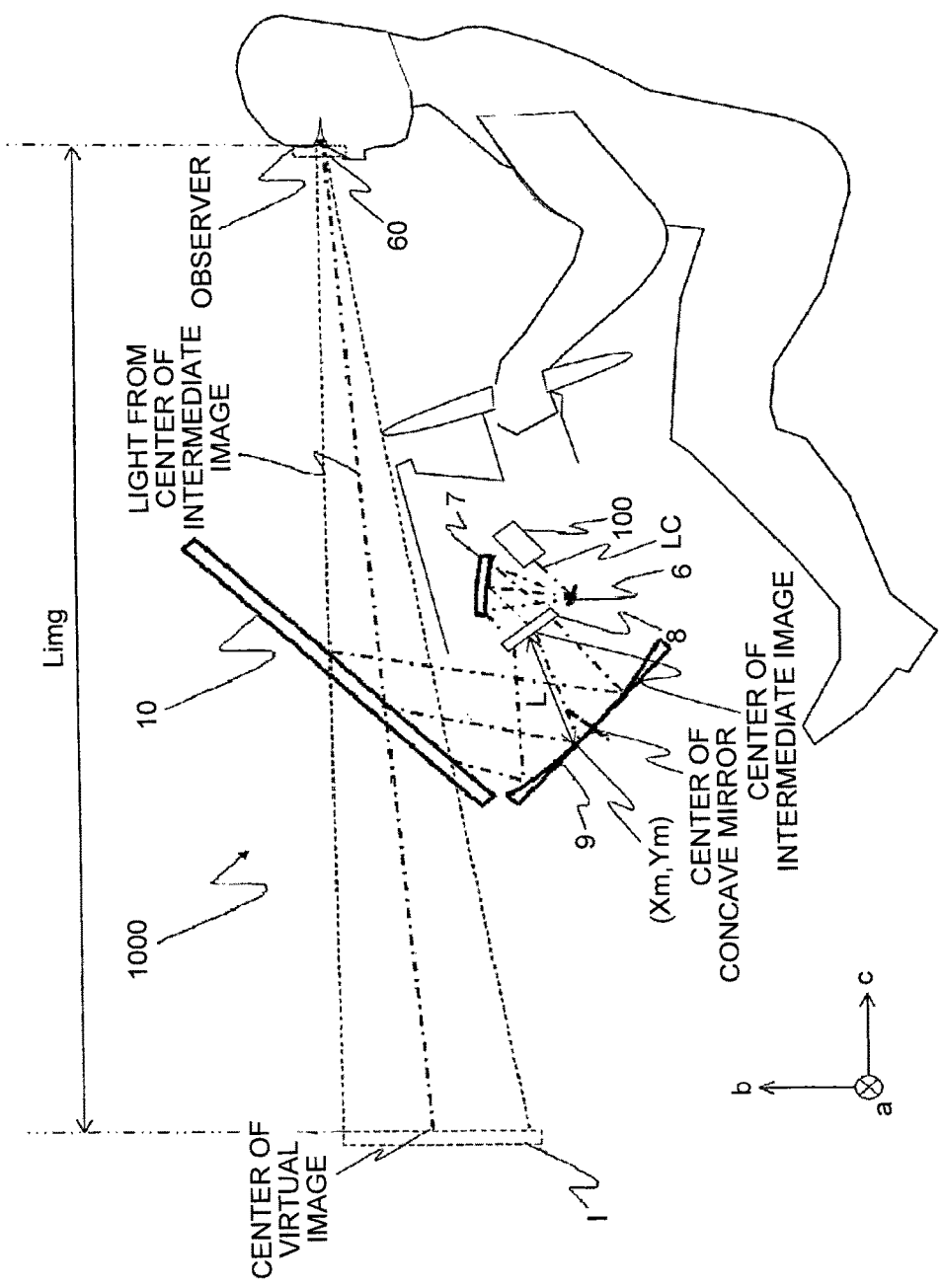
FIG. 1 is a diagram schematically illustrating a configuration of an image display device according to an embodiment.

An image display device 1000 according to an embodiment is a head-up display configured to display a two-dimensional color image. FIG. 1 illustrates the entire device.

The image display device 1000 is mounted on, for example, a movable body such as a vehicle, aircraft, or ship to enable an operator of the movable body to view navigation information (e.g., information such as a velocity and traveled distance) for use in operating the movable body through a front windshield 10 of the movable body. In this case, the front windshield 10 functions also as a transparent reflecting member that permits a part of light incident thereon to pass therethrough but reflects at least a part of the remaining light. Description is given below using, as appropriate, an abc three-dimensional orthogonal coordinates system (which is a coordinate system that moves together with the movable body) applied to the movable body. In the description given below, "a" direction is the left-right direction with reference to the movable body (with "+a" direction being the direction from left to right and "−a" direction being the direction from right to left); "b" direction is the vertical direction with reference to the movable body (with "+b" direction being the direction from bottom to top and "−b" direction being the direction from top to bottom); and "c" direction is the fore-aft direction with reference to the movable body (with "+c" direction being the direction from back to front and "−c" direction being the direction from front to back). An example, where the image display device 1000 is mounted on a vehicle (e.g., an automobile), is described below.

The head-up display as the image display device 1000 includes, for example, a light source unit 100, a two-dimensional deflector 6, a concave mirror 7, a curved screen 8, and a concave mirror 9.

Referring to FIG. 1, the light source unit 100 emits a pixel-displaying beam LC for displaying a color image.

The pixel-displaying beam LC is a single beam, into which beams of three colors (red (R), green (G), and blue (B)) are combined.

Figure 2:
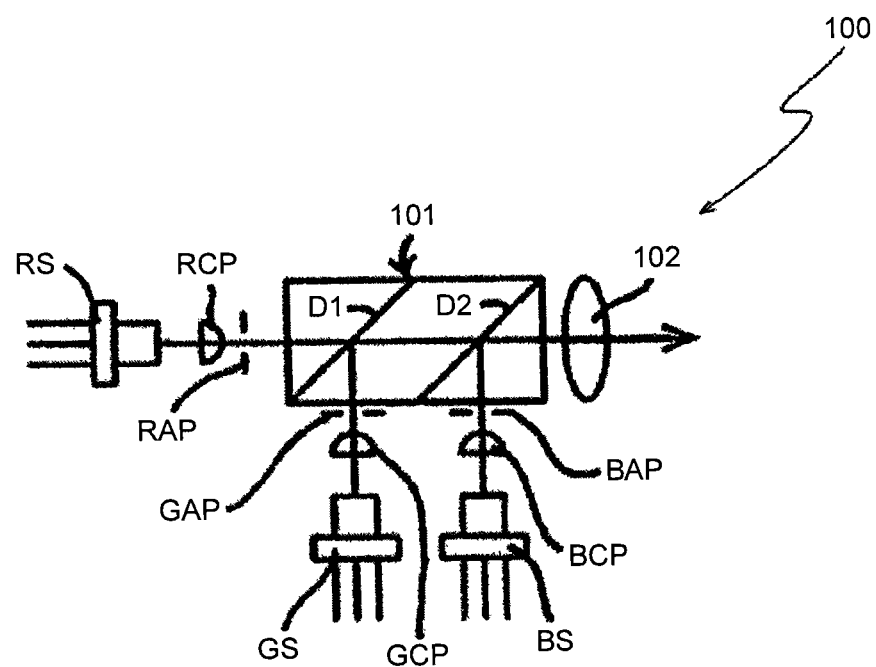
FIG. 2 is an explanatory diagram of a light source unit.

An example configuration of the light source unit 100 is illustrated in FIG. 2.

Referring to FIG. 2, semiconductor lasers RS, GS, and BS, each serving as a light source, emit red, green, and blue laser light, respectively. In the embodiment, an LD (laser diode) which may be also referred to as an edge-emitting laser is used as the each semiconductor laser.

Coupling lenses RCP, GCP, and BCP respectively reduce divergence of the laser light emitted from the semiconductor lasers RS, GS, and BS.

The laser beams, the divergence of which is reduced by the coupling lenses RCP, GCP, and BCP, of the respective colors are shaped using apertures RAP, GAP, and BAP; put another way, the diameters of the beams are truncated.

The shaped laser beams of the respective colors enter a beam combining prism 101.

The beam combining prism 101 includes a dichroic film D1 that permits red light to pass therethrough but reflects green light and a dichroic film D2 that permits red light and green light to pass therethrough but reflects blue light.

Hence, the red, green, and blue laser beams entering the beam combining prism 101 exit the beam combining prism 101 as a single beam, into which the laser beams are combined.

The emitted laser beam is converted by a lens 102 to a "parallel beam" having a predetermined beam diameter.

This "parallel beam" is the pixel-displaying beam LC.

The R, G, and B laser beams constituting the pixel-displaying beam LC are respectively intensity-modulated by image signals (i.e., image data) representing a "two-dimensional color image" to be displayed. The intensity modulation may be either direct modulation of directly modulating the semiconductor lasers or external modulation of modulating the laser beams emitted from the semiconductor lasers.

More specifically, light-emission intensities of the semiconductor lasers RS, GS, BS are modulated by image signals for R, G, and B components, respectively, by a driver (not shown).

The pixel-displaying beam LC emitted from the light source unit 100 impinges on the two-dimensional deflector 6, where the pixel-displaying beam LC is two-dimensionally deflected.

In the embodiment, the two-dimensional deflector 6 is a micromirror configured to oscillate about "two mutually perpendicular axes".

More specifically, the two-dimensional deflector 6 is a two-dimensional scanner including a MEMS (micro electro mechanical systems) mirror manufactured as an oscillating micromirror device through a semiconductor process or the like.

The two-dimensional deflector 6 is not limited to this example. Alternatively, the two-dimensional deflector 6 may be a pair of micromirrors (e.g., MEMS mirrors or galvano mirrors), each oscillating about an axis, combined such that the two micromirrors oscillate mutually perpendicularly.

The pixel-displaying beam LC two-dimensionally deflected as described above impinges on the concave mirror 7 to be reflected toward the curved screen 8.

The curved screen 8 may be, for example, a transparent member (see FIG. 5A) formed by bending a rectangular plate member, whose lengthwise (longitudinal) direction lies along the "a" direction, in the lengthwise direction (i.e., the "a" direction). The "transparent member" denotes a member that permits at least a part of light incident thereon to pass therethrough. In short, the curved screen 8 is a translucent curved structure.

The curved screen 8 will be described in detail later.

The concave mirror 7 is designed so as to correct bowing of a scan line (i.e., scan trajectory) that occurs on the curved screen 8.

The pixel-displaying beam LC reflected off the concave mirror 7 impinges on the curved screen 8 while moving parallel by being deflected by the two-dimensional deflector 6, thereby two-dimensionally scanning the curved screen 8. In short, the curved screen 8 is two-dimensionally scanned (e.g., raster-scanned) in the main-scanning direction and in the sub-scanning direction with the pixel-displaying beam LC.

By this two-dimensional scanning, a "color image" as an intermediate image is formed on the curved screen 8. In the embodiment, an effective scanning area (which is also referred to as "effective image area" in some cases) having a shape formed by bending the rectangular shape of the curved screen 8 in the lengthwise direction is two-dimensionally scanned to form an intermediate image on the effective scanning area (see FIG. 5A).

Hence, the light source unit 100, the two-dimensional deflector 6, the concave mirror 7, and the curved screen 8 make up an intermediate-image forming unit (image forming unit).

As is known, at each instant, "only a pixel irradiated with the pixel-displaying beam LC at the instant" is displayed on the curved screen 8.

A color two-dimensional image is formed as a "group of pixels each displayed at each instant" by the two-dimensional scanning with the pixel-displaying beam LC.

The "color image" is formed on the curved screen 8 in this manner. The pixel-displaying beam LC having formed the color image, namely, light passed through the curved screen 8, impinges on the concave mirror 9 to be reflected therefrom.

Although not shown in FIG. 1, the curved screen 8 has "convex microlens structure" that permits the pixel-displaying beam LC to pass therethrough as will be described later. The concave mirror 9 is included in "virtual-image imaging forming optical system".

As will be described in detail later, the concave mirror 9 is tilted relative to the horizontal plane and is designed and arranged so as to correct distortion of a virtual image of the "color image" (intermediate image) formed on the curved screen 8. The distortion includes two-dimensional distortion, in which horizontal lines (i.e., lateral lines) of the virtual image vertically bulge, and two-dimensional distortion, in which vertical lines (i.e., longitudinal lines) of the virtual image horizontally bulge, both produced due to the curved front windshield 10.

The "virtual-image imaging forming optical system" forms an enlarged virtual image I of the "color image". Hereinafter, the enlarged virtual image I may be sometimes referred to as "virtual image".

The front windshield 10 is arranged upstream of a position, where the enlarged virtual image I is to be formed, to reflect beams, with which the enlarged virtual image I is to be formed, toward a side where an observer is. The observer (e.g., an operator who operates the movable body) views the virtual image from an eye box 60 (a zone near eyes of the observer), which is in an optical path of the laser light reflected off the front windshield 10 (transparent reflecting member). The eye box 60 is a range where the observer can view the virtual image without adjusting the location of his/her view point. More specifically, the eye box 60 is substantially similar to or smaller than "Eye range of drivers for automobiles" (JIS D0021).

The reflected light enables the observer to view the enlarged virtual image I.

Referring to FIG. 1, the "a" direction is generally the left-right direction for the observer. This direction may sometimes be referred to as the "lateral direction". Similarly, the direction perpendicular to the lateral direction (i.e., the "a" direction) may sometimes be referred to as the "longitudinal direction".

The curved screen 8 has a curved structure bulging toward the concave mirror 9 as a whole. In the embodiment, the curved screen 8 is curved only in the "a" direction (i.e., in the x-direction) or, put another way, in the lateral direction, with a uniform curvature (see FIG. 5A). In short, the curved screen 8 has a cylindrical shape. The shape of the curved screen 8 is not limited to such a cylindrical shape, in which the curved screen 8 is curved only in the lateral direction with a uniform curvature. For example, the curved screen 8 may alternatively have a cylindrical shape, in which the curved screen 8 is curved only in the longitudinal direction with a uniform curvature, a toroidal shape as illustrated in FIG. 5B, in which the curved screen 8 is curved with curvatures varying between the longitudinal direction and the lateral direction, a spherical shape, in which the curved screen 8 is curved with a uniform curvature, or a freeform surface shape.

Meanwhile, the observer views the enlarged virtual image I through the front windshield 10 with his/her point of view placed in the eye box 60. If a flat screen is arranged between the concave mirror 7 and the concave mirror 9, deflecting action of the two-dimensional deflector 6 and enlarging reflection off the concave mirror 9 will undesirably cause field curvature (i.e., three-dimensional distortion) in the enlarged virtual image I.

However, the field curvature can be effectively corrected by using a curved screen that is curved so as to offset the field curvature.

Furthermore, in the embodiment, the curved screen is a transparent type as described earlier. A detailed description about this is given below. When the curved screen is of "transparent type", as illustrated in (A) in FIG. 6, a scan line produced by the two-dimensional deflector is bowed in the same direction as the concave side of the curved screen. As a result, because light can be collected on the curved screen, a sharp image is formed on the curved screen.

Figure 6:
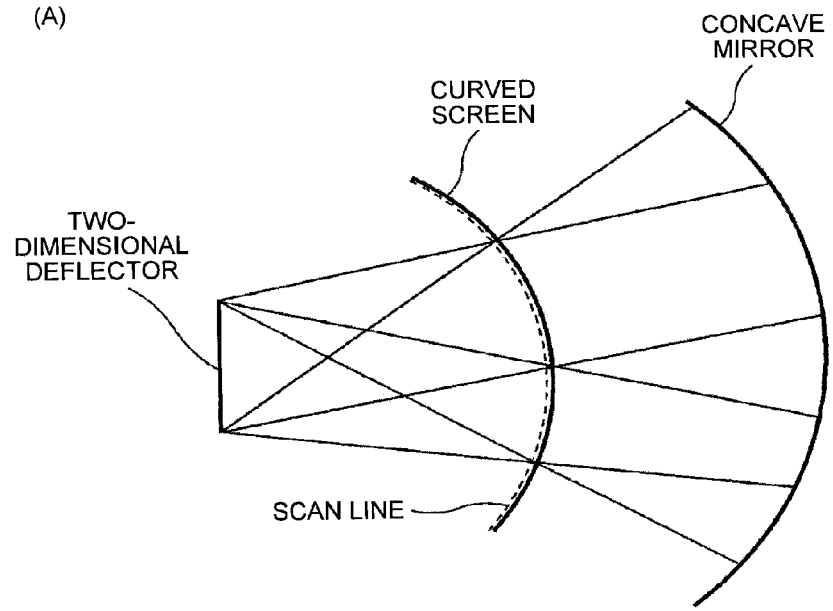
FIG. 6 illustrates an advantage of a curved screen of transparent type and a disadvantage of a curved screen of reflection type.
Figure 6:
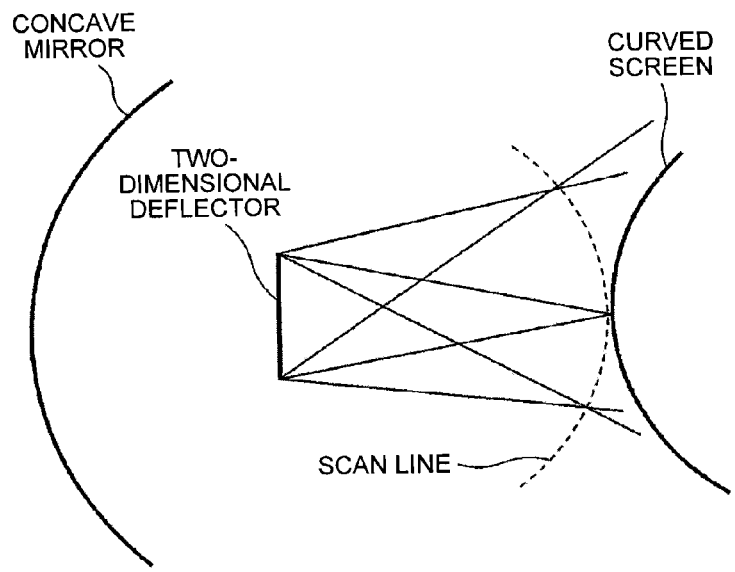

By contrast, when the curved screen is of "reflection type", as illustrated in (B) in FIG. 6, a scan line produced by the two-dimensional deflector bulges toward the convex side of the curved screen. As a result, because light cannot be collected on the curved screen, an unsharp image is formed on the curved screen.

Hence, when a curved screen of a reflection type is used, the need of correcting the scan line using a freeform surface lens or the like arises so that the scan line conforms to the screen shape, whereas when a curved screen of a transparent type is used, the need of correction using a freeform surface lens or the like is eliminated.

Figure 3:
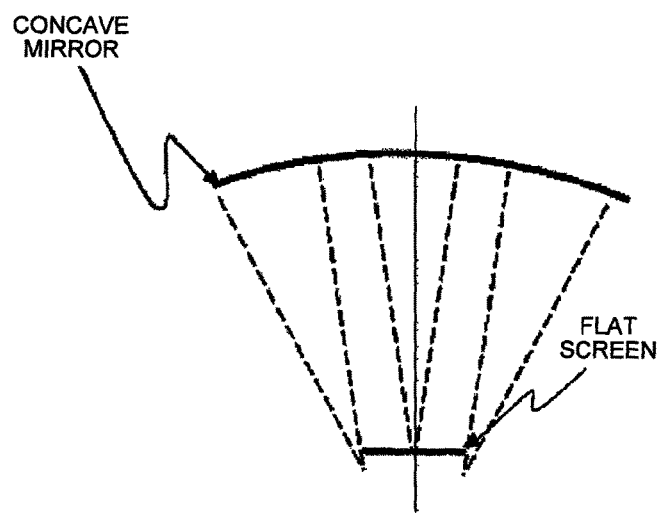
FIG. 3 illustrates an optical path from a flat screen to a concave mirror and a graph illustrating field curvature of a virtual image formed using the flat screen.
Figure 3:
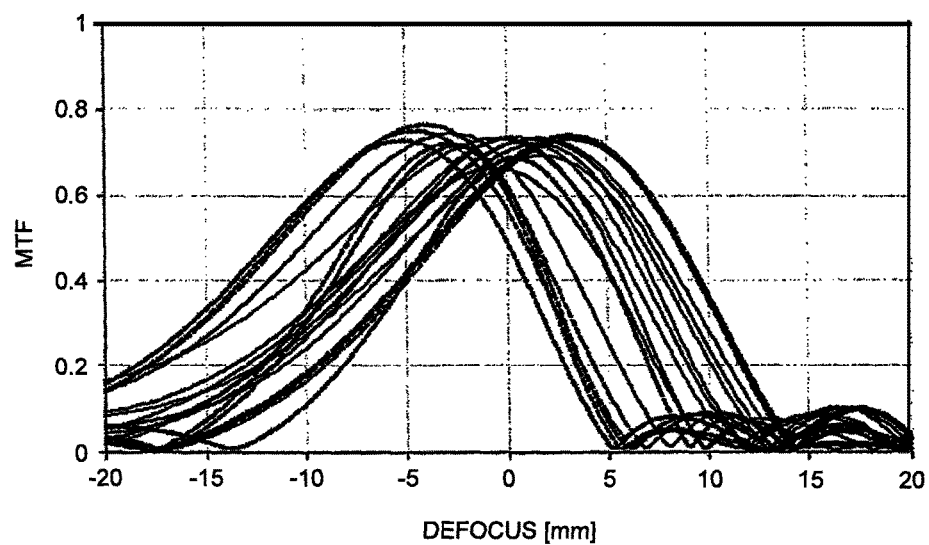

When a flat screen is used, as illustrated in (A) in FIG. 3, variation among optical path lengths of light outgoing from the flat screen and incident on the concave mirror is relatively large. More specifically, the difference between an optical path length of center light and those of light on ends is relatively large. This results in relatively large field curvature (see (B) in FIG. 3). In FIG. 3, (B) illustrates MTF (modulation transfer function)-defocus characteristics in a situation where point of view is placed on the left end of the eye box 60.

Figure 4:
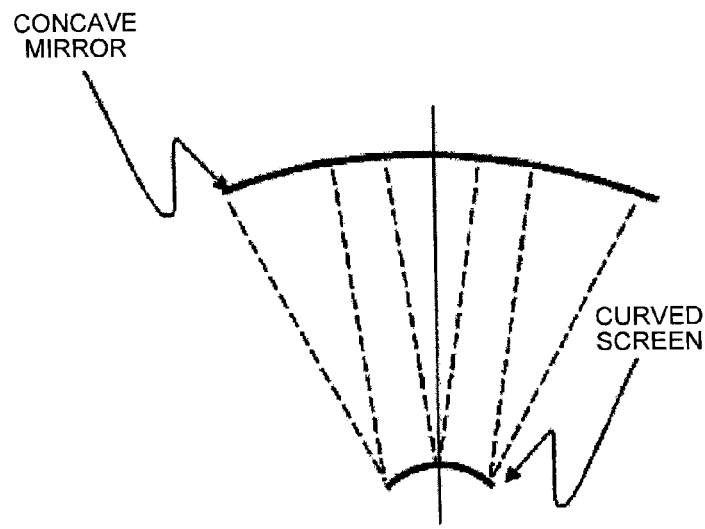
FIG. 4 illustrates an optical path from a curved screen to a concave mirror and a graph illustrating field curvature of a virtual image formed using the curved screen.
Figure 4:
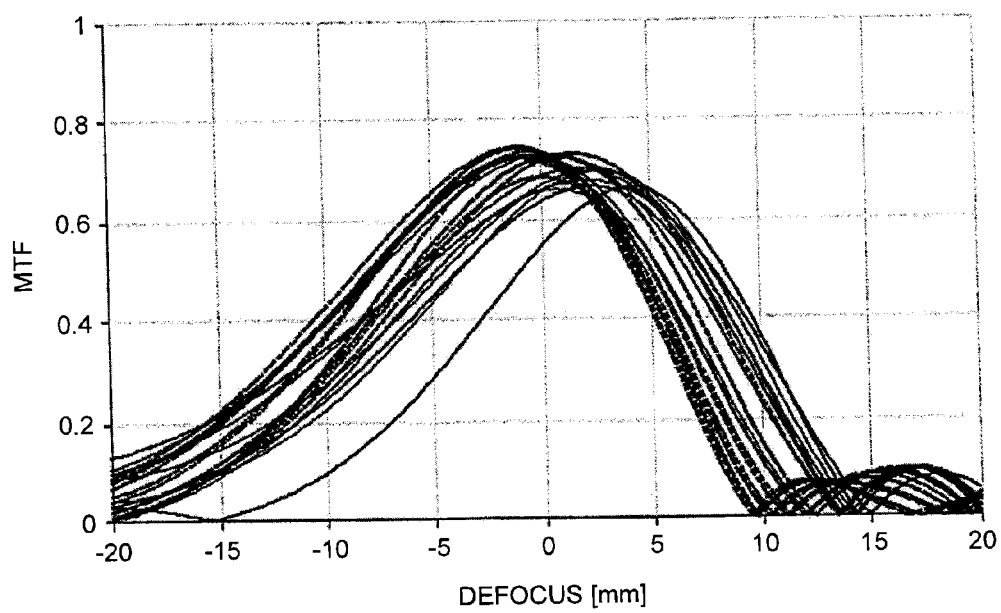

When a curved screen bulging toward a concave mirror as illustrated in (A) in FIG. 4 is used, variation among optical path lengths of light outgoing from the curved screen and incident on the concave mirror is relatively small. More specifically, the difference between an optical path length of center light and those of light on ends is relatively small.

This results in relatively small field curvature (see (B) in FIG. 4). In FIG. 4, (B) illustrates MTF-defocus characteristics in a situation where point of view is placed on the left end of the eye box 60.

Thus, the field curvature can be effectively reduced by using a curved screen.

As described above, the curved screen 8 has the convex microlens structure.

As will be described later, the convex microlens structure is formed by "three-dimensionally arranging a plurality of convex microlenses densely at a pitch close to a pixel pitch so as to form the "curved structure" as a whole". In short, the curved screen 8 is a microlens array that is curved as a whole.

In the embodiment, the plurality of convex microlenses is three-dimensionally arrayed at a predetermined pitch along a virtual curved surface bulging toward the concave mirror 9 so that light is incident on the convex side of the microlens array. Examples of the array of the convex microlenses include a matrix array, in which rows lie along the "a" direction (i.e., the x-direction) and columns lie along the one direction (i.e., the y-direction) perpendicular to the "a" direction in the virtual curve, and a honeycomb array (i.e., a zigzag array).

Each of the convex microlenses has a circular, regular polygonal whose number of sides is N (N is a natural number larger than two), or the like shape in plan view. In the embodiment, the convex microlenses are identical in curvature (and hence curvature radius).

Each of the convex microlenses has a function of isotropically diverging the pixel-displaying beam LC. In other words, each of the convex microlenses has a diverging power that is uniform in every direction. This "diverging function" is briefly described below.

Figure 5A:
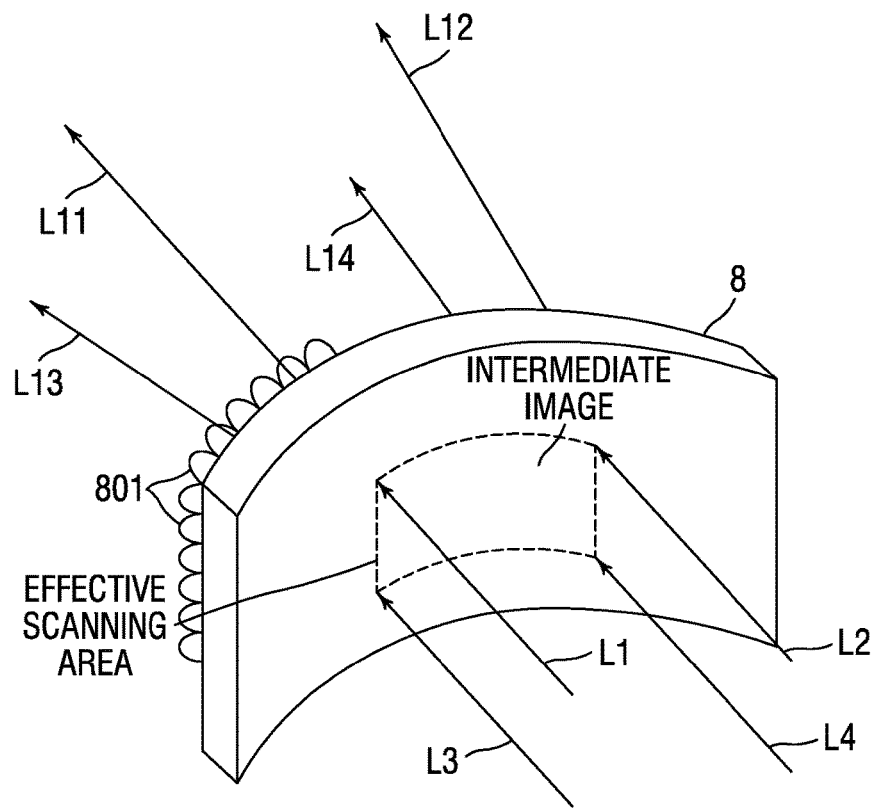
FIG. 5A is an explanatory diagram of diffusing effect provided by a cylindrical convex microlens structure.
Figure 5B:
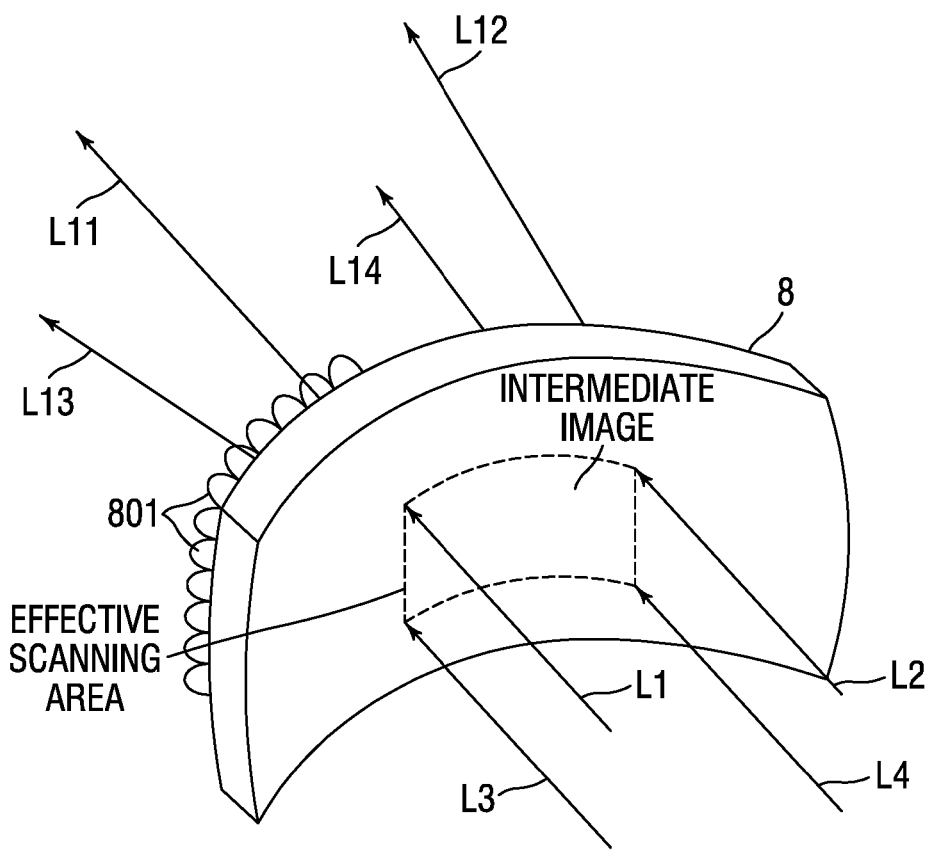
FIG. 5B is an explanatory diagram of diffusing effect provided by a torridial convex microlens structure.

FIG. 5A illustrates four pixel-displaying beams, which are designated by the reference numerals L1 to L4, incident on the curved screen 8.

It is assumed that the four pixel-displaying beams L1 to L4 are pixel-displaying beams respectively incident on four corners of an image formed on the curved screen 8.

The four pixel-displaying beams L1 to L4 are converted to beams L11 to L14 through the curved screen 8.

If a bundle of beams having a laterally-elongated quadrilateral cross section defined by the pixel-displaying beams L1 to L4 enters the curved screen 8, the bundle of beams is converted to a "bundle of diverging beams having a laterally-elongated quadrilateral cross section defined by the beams L11 to L14".

This function of the convex microlenses is "diverging function". In FIGS. 5A and 5B, the microlenses are designated by 801.

The "bundle of diverging beams defined by the beams L11 to L14" is a group of diverging beams, into which the pixel-displaying beams are converted as described above over time.

The pixel-displaying beams are converted to such diverging beams so that "a bundle of the beams reflected off the front windshield 10 irradiates a large area near the observer's eyes".

Without the diverging function described above, the bundle of beams reflected off the front windshield 10 will irradiate only a "small area near the observer's eyes".

In this case, if the observer moves his/her head in a manner that brings his/her eyes out of the "small area", the observer cannot view the enlarged virtual image I.

However, when the pixel-displaying beam LC is diverged as described above, the bundle of beams reflected off the front windshield 10 irradiates the "large area near the observer's eyes". Hence, the size of the eye box 60 can be increased.

Accordingly, even if the observer slightly moves his/her head, the observer can reliably view the enlarged virtual image I.

A microlens array used as the curved screen 8 is described below with reference to (A) and (B) in FIG. 10. For convenience, an example microlens array, in which a plurality of convex microlenses is two-dimensionally arrayed along a virtual plane, is described below.

Figure 10:
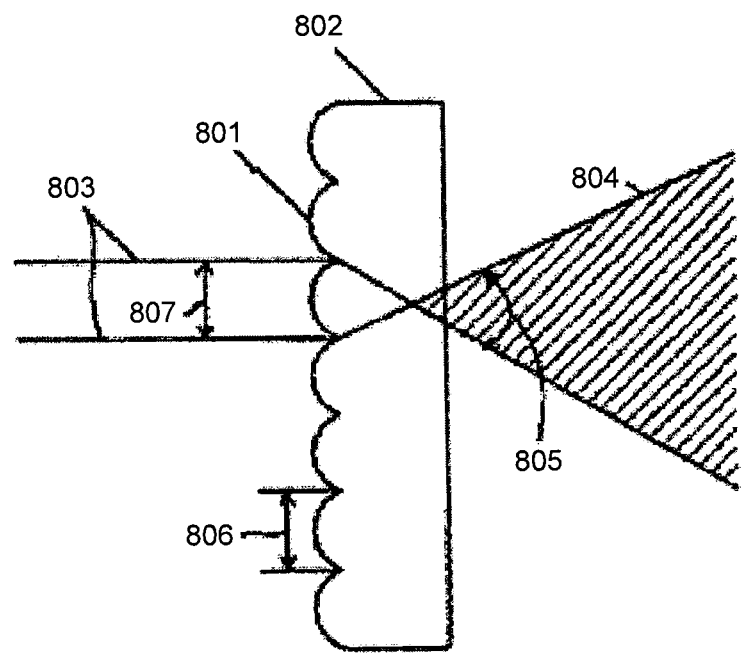
FIG. 10 illustrates how convex microlenses cause diffusion and produce interference noise.
Figure 10:
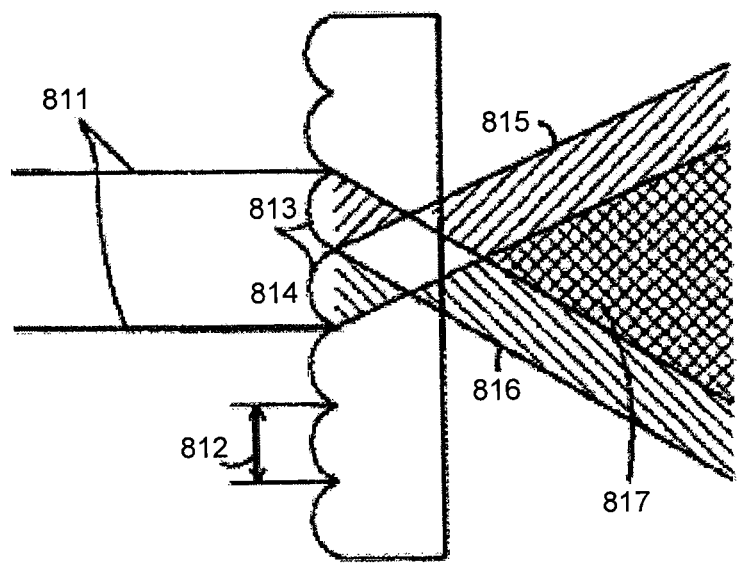

In (A) in FIG. 10, the microlens array is designated by the reference numeral 802. The microlens array 802 has a convex microlens structure, in which convex microlenses 801 are arrayed. A beam diameter 807 of a pixel-displaying beam 803 is smaller than a lens size of the convex microlens 801. Put another way, a lens size 806 of the convex microlens 801 is larger than the beam diameter 807. In the embodiment described herein, the pixel-displaying beam 803 is a laser beam whose optical intensity has a Gaussian-like distribution centered on the beam center. Accordingly, the beam diameter 807 is the radial distance between positions, where the optical intensity drops to "$1/e^2$" in the optical intensity distribution, of the beam.

In (A) in FIG. 10, the beam diameter 807 is depicted as being equal to the lens size 806 of the convex microlens 801; however, it is not requisite that the beam diameter 807 is equal to "the lens size 806 of the micro convex lens 801". The beam diameter 807 can be of any value not exceeding the lens size 806 of the convex microlens 801. Referring to FIG. 10A, the entire pixel-displaying beam 803 impinges on the single convex microlens 801, where the pixel-displaying beam 803 is converted to a diverging beam 804 with a divergence angle 805. The "divergence angle" may sometimes be referred to as "diffusion angle" below.

In the situation illustrated in (A) in FIG. 10, because there is the single diverging beam 804 or, put another way, there is no other beam interfering with the diverging beam 804, interference noise will not be produced. Note that the divergence angle 805 can be set to a desired value by adjusting the shape of the convex microlens 801.

In (B) in FIG. 10, a pixel-displaying beam 811 having a beam diameter twice as large as a pitch 812 of the array of the convex microlenses is incident on two convex microlenses 813 and 814 in a straddling manner. In this case, the pixel-displaying beam 811 is diverged by the two convex microlenses 813 and 814 into two diverging beams 815 and 816. The two diverging beams 815 and 816 overlap on each other in an area 817 and interfere with each other in this portion, thereby producing interference noise (i.e., speckle noise).

Meanwhile, when the front windshield 10 is tilted relative to the horizontal plane and curved as described above, distortion asymmetrical in both the horizontal and vertical directions (i.e., two-dimensional distortion; hereinafter, simply referred to as "distortion") appears in the enlarged virtual image I.

In view of the above, in the embodiment, a freeform surface mirror whose reflection surface (concave surface) has curvature distribution is used as the concave mirror 9 to effectively correct the distortion or, more specifically, to produce distortion offsetting the distortion produced due to the front windshield 10.

This will be described in detail below. In a three-dimensional orthogonal coordinates system (X, Y, Z), in which the center coordinate of the reflection surface of the concave mirror 9 is set as (0, 0, 0), Z coordinates can be represented by higher order X-Y polynomials. Meanwhile, the direction of X is the lateral direction; the direction of Y is the longitudinal direction.

The X-Y polynomials representing the concave mirror 9 are designed so as to correct the distortion depending on tilt and curve of the front windshield 10 (see Tables 1 to 5). Tables 1 to 5 contain coefficients for each order of X-Y polynomials of respective Examples of the embodiment.

With regard to the X-Y polynomials representing the concave mirror 9, the larger the distance from the center of the concave mirror 9, the higher the effect of the distortion correction.

Figure 7:
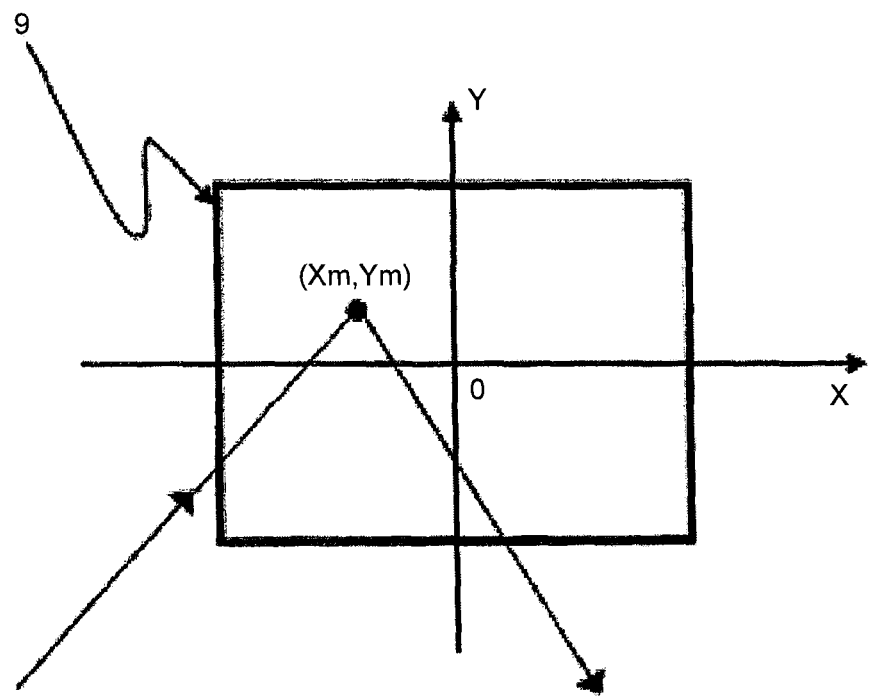
FIG. 7 is an explanatory diagram of an incident position (Xm, Ym) on the concave mirror of light outgoing from center of an image formed on the curved screen.

To take this into account, in the embodiment, positional relationship between the curved screen 8 and the concave mirror 9 are set so that light outgoing from the center of an intermediate image formed on the curved screen 8 or, in other words, light having formed the center of the intermediate image (and hence to be viewed as the center of the enlarged virtual image I), impinges (eccentrically impinges) on the concave mirror 9 at a position (Xm, Ym) other than the center (0, 0) of the concave mirror 9 (see FIG. 7). Meanwhile, the image forming unit and the concave mirror 9 are laid out relative to the front windshield 10 so that a part of the light outgoing from the center of the intermediate image and reflected off the concave mirror 9 at the position other than the center of the concave mirror 9 is reflected off the front windshield 10 to impinge on the center of the eye box 60. In short, the center of the eye box 60 corresponds to the center, which is a virtual image of the center of the intermediate image, of the enlarged virtual image I.

In the embodiment, the intermediate image has a shape formed by bending a rectangle in the lengthwise direction. Accordingly, the center of the intermediate image is the intersection of diagonal lines of the intermediate image.

Hence, the embodiment can correct the distortion effectively as compared with a configuration where light outgoing from the center of an intermediate image impinges (non-eccentrically impinges) on the center of the concave mirror 9.

Tables 1 to 5 contains specific examples of the incident position (Xm, Ym), where light outgoing from the center of the intermediate image (i.e., light that is to impinge on the center of the eye box 60) impinges on the concave mirror 9, of Examples 1 to 20. In each Example, (Xm, Ym) is not (0, 0), which indicates that the light eccentrically impinges on the concave mirror 9.

Figure 8:
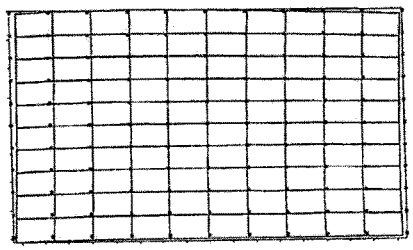
FIG. 8 illustrates a virtual image formed by causing light from the curved screen to eccentrically impinge on the concave mirror, a virtual image formed by causing light from a flat screen to eccentrically impinge on the concave mirror, a virtual image formed by causing light from the curved screen to non-eccentrically impinge on the concave mirror, and a virtual image formed by causing light from the flat screen to non-eccentrically impinge on the concave mirror.
Figure 8:
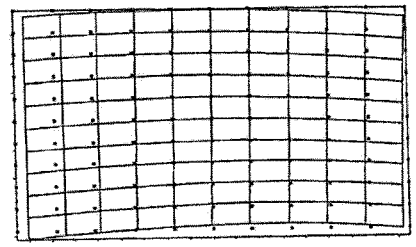
Figure 8:
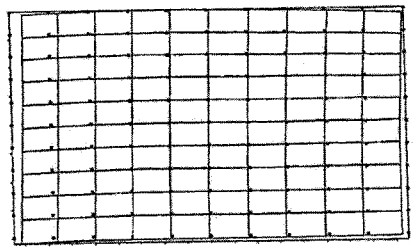
Figure 8:
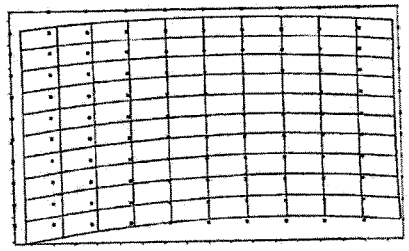

In FIG. 8, (A) to (D) illustrate specific examples of distortion in virtual image. In each of (A) to (D), lattice points represent an ideal virtual image free from distortion; solid lines represent a virtual image obtained from simulation.

In FIG. 8, (A) illustrates a virtual image formed by causing light from the curved screen 8 to eccentrically impinge on the concave mirror 9. In FIG. 8, (A) indicates that distortion of longitudinal lines and that of lateral lines are both small.

In FIG. 8, (B) illustrates a virtual image formed by causing light from a flat screen to eccentrically impinge on the concave mirror 9. In FIG. 8, (B) indicates that whereas distortion of longitudinal lines is small, distortion of lateral lines is large.

In FIG. 8, (C) illustrates a virtual image formed by causing light from the curved screen 8 to non-eccentrically impinge on the concave mirror 9. In FIG. 8, (C) indicates that whereas distortion of longitudinal lines is large, distortion of lateral lines is small.

In FIG. 8, (D) illustrates a virtual image formed by causing light from a flat screen to non-eccentrically impinge on the concave mirror 9. In FIG. 8, (D) indicates that distortion of longitudinal lines and that of lateral lines are both large.

Hence, field curvature and distortion can be effectively corrected by using the curved screen 8 as the screen, where an intermediate image is to be formed, and by causing light having formed center of an intermediate image to impinge on the concave mirror 9 at a position other than the center of the concave mirror 9.

In the embodiment, Expression (1) below is preferably satisfied:

$$0.15 \leq R/L \leq 2.0 \tag{1}$$

where L is the optical length of light, outgoing from the center of the intermediate image formed on the curved screen 8 and incident on the concave mirror 9, from the center of the intermediate image to the concave mirror 9; and if the curved screen 8 has a cylindrical shape with a curvature in any one of the lengthwise direction and the crosswise direction, R is the curvature radius of the curved screen 8 in the one of the lengthwise direction and the crosswise direction, if the curved screen 8 has a toroidal shape with a curvature in the lengthwise direction, R is the curvature radius of the curved screen 8 in the lengthwise direction, if the curved screen 8 has a spherical shape with a uniform curvature, R is the curvature radius of the curved screen 8.

Expression (1) above is a conditional expression for appropriately determining the curvature radius of the curved screen 8. If R/L exceeds the upper limit (=2.0) of Expression (1), an excessively large curvature radius (i.e., excessively small curvature) of the curved screen 8 will result in insufficient correction of field curvature.

On the other hand, if R/L is below the lower limit (=0.15) of Expression (1), an excessively small curvature radius (i.e., excessively large curvature) will result in failure to correct field curvature. Furthermore, the curved screen 8 is excessively distant from the concave mirror 9, which is disadvantageous for downsizing.

In the embodiment, Expression (2) below is preferably satisfied:

$$0.01 \leq \beta/R \leq 0.7 \tag{2}$$

where β is a value obtained by dividing the length in the "a" direction (i.e., the lateral direction) of the virtual image viewed through the front windshield 10 by the length in the "a" direction (i.e., the lateral direction) of the intermediate image; and if the curved screen 8 has a cylindrical shape with a curvature in any one of the lengthwise direction and the crosswise direction, R is the curvature radius in millimeters of the curved screen 8 in the one of the lengthwise direction and the crosswise direction, if the curved screen 8 has a toroidal shape with a curvature in the lengthwise direction, R is the curvature radius in millimeters of the curved screen 8 in the lengthwise direction, if the curved screen 8 has a spherical shape with a uniform curvature, R is the curvature radius in millimeters of the curved screen 8.

Expression (2) above is a conditional expression for appropriately determining a lateral magnification of the projection optical system including the curved screen 8 and the concave mirror 9.

If β/R exceeds the upper limit (=0.7) of Expression (2), an excessively high magnification of the projection optical system in the "a" direction (i.e., the lateral direction) will make distortion likely to occur, which is unpreferable.

On the other hand, if β/R is below the lower limit (=0.01) of Expression (2), an excessively low magnification of the projection optical system in the "a" direction (i.e., the lateral direction) becomes a detriment to downsizing, which is unpreferable.

In the embodiment, Expression (3) below is preferably satisfied:

$$0.01 \leq \alpha/R \leq 0.7 \quad (3)$$

where α is a value obtained by dividing the length in the "b" direction (i.e., the longitudinal direction) of the virtual image viewed through the front windshield 10 by the length in the "b" direction (i.e., the longitudinal direction) of the intermediate image; and if the curved screen 8 has a cylindrical shape with a curvature in any one of the lengthwise direction and the crosswise direction, R is the curvature radius in millimeters of the curved screen 8 in the one of the lengthwise direction and the crosswise direction, if the curved screen 8 has a toroidal shape with a curvature in the lengthwise direction, R is the curvature radius in millimeters of the curved screen 8 in the lengthwise direction, if the curved screen 8 has a spherical shape with a uniform curvature, R is the curvature radius in millimeters of the curved screen 8.

Expression (3) above is a conditional expression for appropriately determining a longitudinal magnification of the projection optical system including the curved screen 8 and the concave mirror 9.

If α/R exceeds the upper limit (=0.7) of Expression (3), an excessively high magnification of the projection optical system in the "b" direction (i.e., the longitudinal direction) makes distortion likely to occur, which is unpreferable.

On the other hand, if α/R is below the lower limit (=0.01) of Expression (3), an excessively low magnification of the projection optical system in the "b" direction (i.e., the longitudinal direction) becomes a detriment to downsizing, which is unpreferable.

In the embodiment, Expression (4) below is preferably satisfied:

$$0.005 \leq R/Limg \leq 0.15 \quad (4)$$

where Limg is the distance from a point of view of an observer viewing the virtual image of the intermediate image formed on the curved screen 8 through the front windshield 10 to the virtual image; and if the curved screen 8 has a cylindrical shape with a curvature in any one of the lengthwise direction and the crosswise direction, R is the curvature radius of the curved screen 8 in the one of the lengthwise direction and the crosswise direction, if the curved screen 8 has a toroidal shape with a curvature in the lengthwise direction, R is the curvature radius of the curved screen 8 in the lengthwise direction, if the curved screen 8 has a spherical shape with a uniform curvature, R is the curvature radius of the curved screen 8.

Expression (4) above is a conditional expression for appropriately determining the curvature radius of the curved screen 8 and the distance between the point of view and the virtual image.

If R/Limg exceeds the upper limit (=0.15) of Expression (4), an excessively large curvature radius of the curved screen 8 will lessen the field curvature correction effect, which is undesirable.

On the other hand, if R/Limg is below the lower limit (=0.005) of Expression (4), an excessively small curvature radius of the curved screen 8 will correct the field curvature excessively, which is undesirable.

In the embodiment, Expression (5) below is preferably satisfied:

$$0.8 \leq R/R' \leq 2.2 \quad (5)$$

where, when the curved screen 8 has a toroidal shape with curvatures varying between the lengthwise direction and the crosswise direction, R is the curvature radius of the curved screen 8 in the lengthwise direction, and R' is the curvature radius of the same in the crosswise direction.

Forming the curved screen 8 in a toroidal shape with curvatures varying between the lengthwise direction and the crosswise direction enables effective correction of field curvature of the virtual image in the lateral direction and in the longitudinal direction possible.

Expression (5) above is a conditional expression for appropriately determining the curvature radius in the lengthwise direction and that in the crosswise direction of the curved screen 8 when the curved screen 8 has a toroidal shape.

If R/R' exceeds the upper limit (=2.2) of Expression (5), an excessively large curvature radius in the lengthwise direction of the curved screen 8 will result in insufficient correction of field curvature.

On the other hand, if R/R' is below the lower limit (=0.8) of Expression (5), an excessively large curvature radius of the curved screen 8 in the crosswise direction will result in insufficient correction of field curvature.

Figure 11:
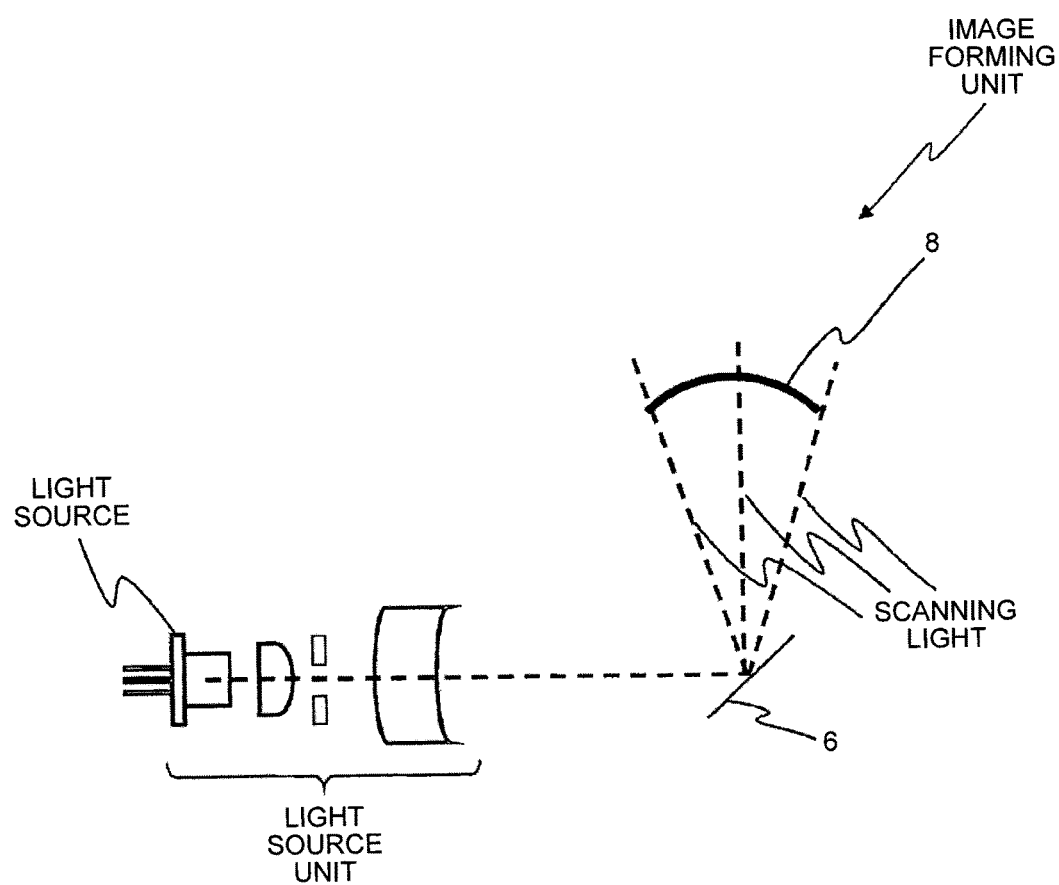
FIG. 11 is an explanatory diagram of a first modification of the image forming unit.

If, as in a first modification of the image forming unit illustrated in FIG. 11, the concave mirror 7 for correcting bowing of a scan line (scan trajectory) is not arranged between the two-dimensional deflector 6 and the curved screen 8, light from the light source unit is moved by the two-dimensional deflector 6 to perform scanning with scan-line bow.

However, if the curved screen 8 is arranged so as to compensate for the scan-line bow, the need of arranging an optical component such as a freeform surface lens or the concave mirror 7 in the optical path between the two-dimensional deflector 6 and the curved screen 8 to correct the scan line is eliminated or, put another way, the need of flattening a scan surface is eliminated. This enables reduction in the number of parts and reduction in tolerance sensitivity.

Table 1 below contains optical parameters of Examples 1 to 4. Table 2 contains optical parameters of Examples 5 to 8. Table 3 contains optical parameters of Examples 9 to 12. Table 4 contains optical parameters of Examples 13 to 16. Table 5 contains optical parameters of Examples 17 to 20. Table 6 contains values, each to three decimal places, of R/L, β/R (1/mm), α/R (1/mm), R/Limg, and R/R' of the respective Examples.

In Tables 1 to 5, an xyw coordinate system (where the x-direction is the lateral direction; the y-direction is the longitudinal direction; the w-direction is the direction orthogonal to both the x-direction and the y-direction) (see FIG. 5A) applied to the curved screen 8 (transparent member) and the XY coordinate system applied to the concave mirror 9 are used. R is the curvature radius of the curved screen 8. If the curved screen 8 has a cylindrical shape with a curvature in any one of the lengthwise direction and the crosswise direction, R is the curvature radius of the curved screen 8 in the one of the lengthwise direction and the crosswise direction. If the curved screen 8 has a toroidal shape with a curvature in the lengthwise direction, R is the curvature radius of the curved screen 8 in the lengthwise direction, and R' is the curvature radius of the same in the crosswise direction. If the curved screen 8 has a spherical shape with a uniform curvature, R is the curvature radius of the curved screen 8.

The concave mirror 9, which is a freeform surface mirror, is defined by Equation (a) below:

$$z = \frac{cr^2}{1 + \sqrt{1-(1+k)c^2r^2}} + \sum_{j=2}^{66} C_j x^m y^n \quad (a)$$

$$j = \frac{(m+n)^2 + m + 3n}{2} + 1$$

where z is the sag of a plane, which is parallel to the Z-axis, of the concave mirror 9, c is a curvature of a surface vertex (and hence a curvature radius is 1/c), r is the vertical distance from the center axis of the concave mirror 9, k is a conic constant, and Cj is a coefficient of the X-Y polynomial.

FIGS. 12 to 15 illustrate specific examples of the intermediate image formed on the curved screen 8 (transparent member).

Figure 12:
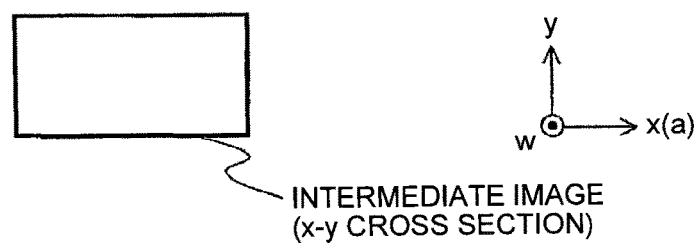
FIG. 12 illustrates a shape of an intermediate image formed on the curved screen having a cylindrical shape with a curvature in the lengthwise direction.
Figure 12:
Figure 12:

In Examples 1 to 10, the curved screen 8 has a cylindrical shape with a curvature in the lengthwise direction (i.e., the lateral direction) (see (A) to (C) in FIG. 12). FIGS. 16 to 25 respectively illustrate MTF-defocus characteristics, which represent field curvature, of Examples 1 to 10.

Figure 13:
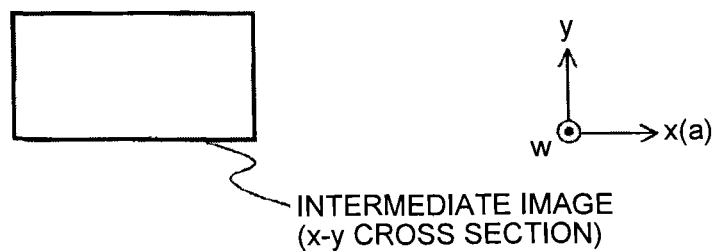
FIG. 13 illustrates a shape of an intermediate image formed on the curved screen having a toroidal shape with curvatures in the lengthwise direction and in the crosswise direction.
Figure 13:
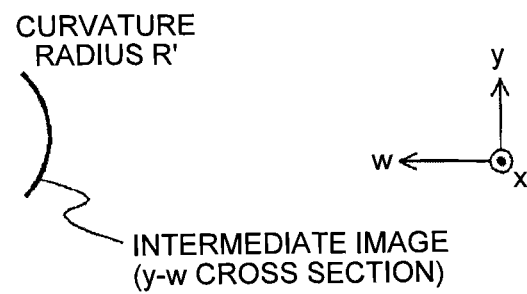
Figure 13:
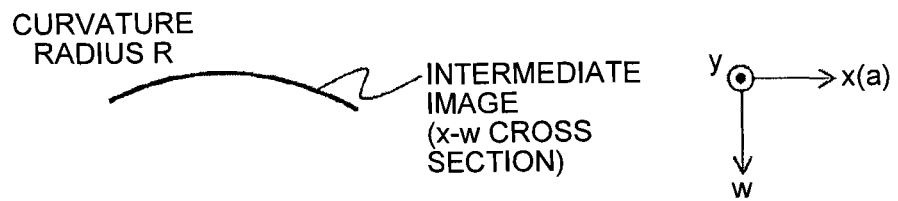

In Examples 11 to 15, the curved screen 8 has a toroidal shape with curvatures varying between the lengthwise direction (i.e., the lateral direction) and the crosswise direction (i.e., the longitudinal direction) (see (A) to (C) in FIG. 13). FIGS. 26 to 30 respectively illustrate MTF-defocus characteristics, which represent field curvature, of Examples 11 to 15.

Figure 14:
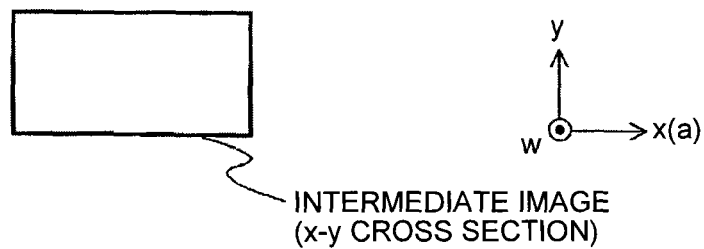
FIG. 14 illustrates a shape of an intermediate image formed on the curved screen having a spherical shape.
Figure 14:
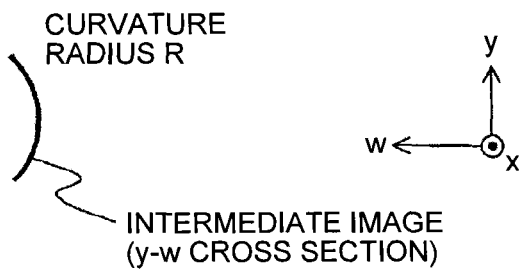
Figure 14:
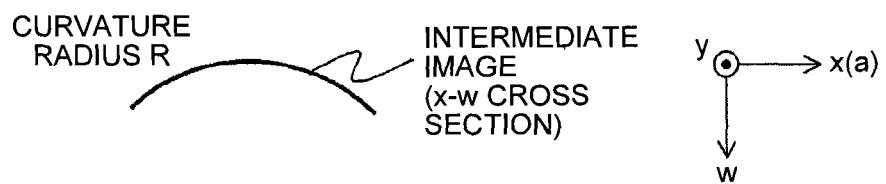
Figure 15:
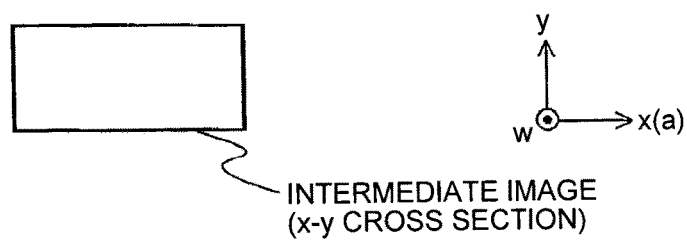
FIG. 15 illustrates a shape of an intermediate image formed on the curved screen having a freeform surface shape.
Figure 15:
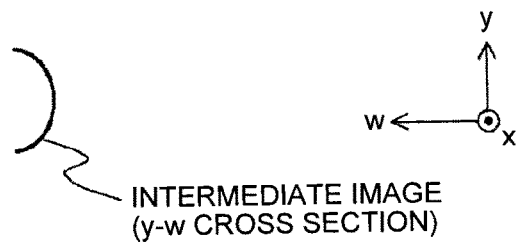
Figure 15:
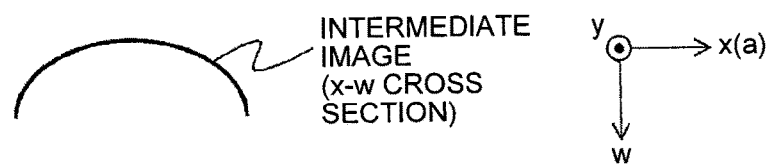
Figure 16:
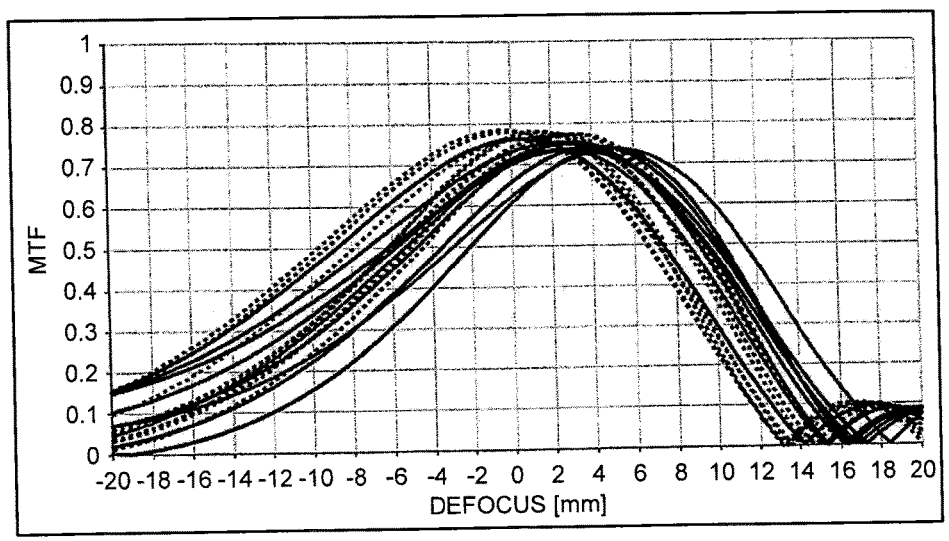
FIG. 16 is a diagram illustrating field curvature of Example 1.
Figure 17:
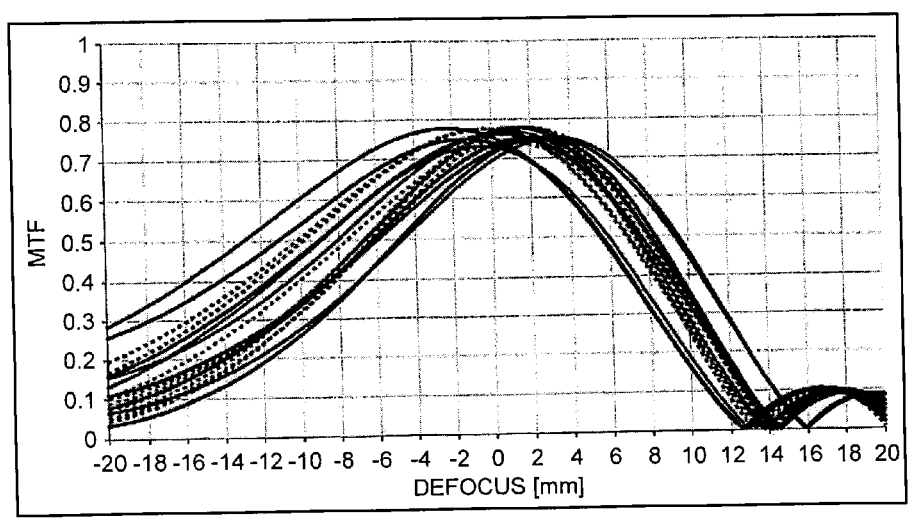
FIG. 17 is a diagram illustrating field curvature of Example 2.
Figure 18:
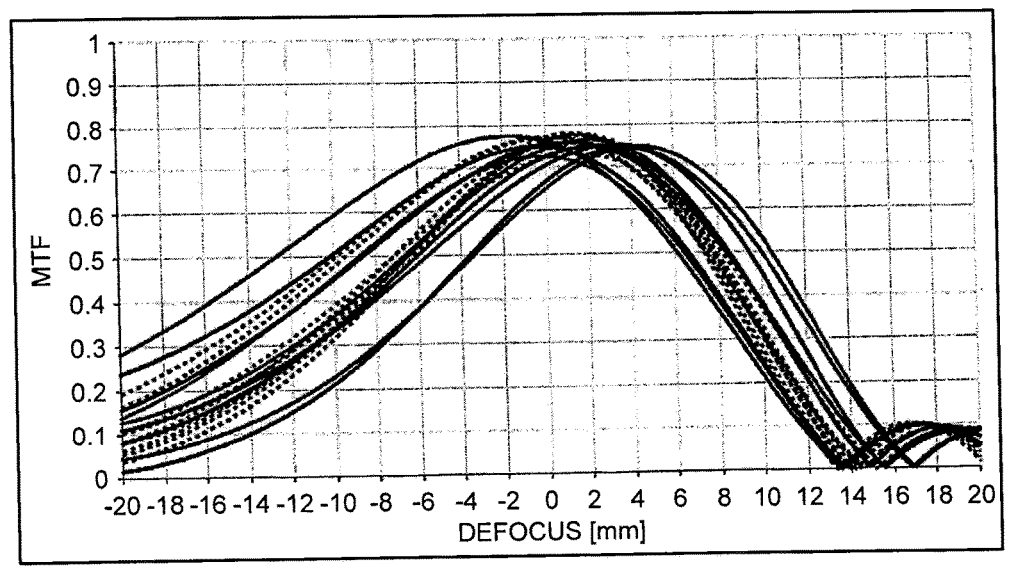
FIG. 18 is a diagram illustrating field curvature of Example 3.
Figure 19:
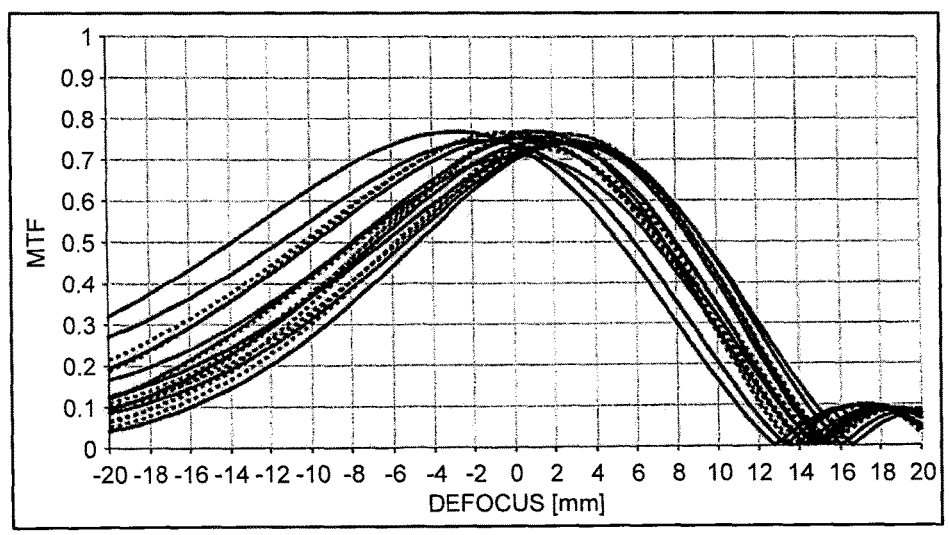
FIG. 19 is a diagram illustrating field curvature of Example 4.
Figure 20:
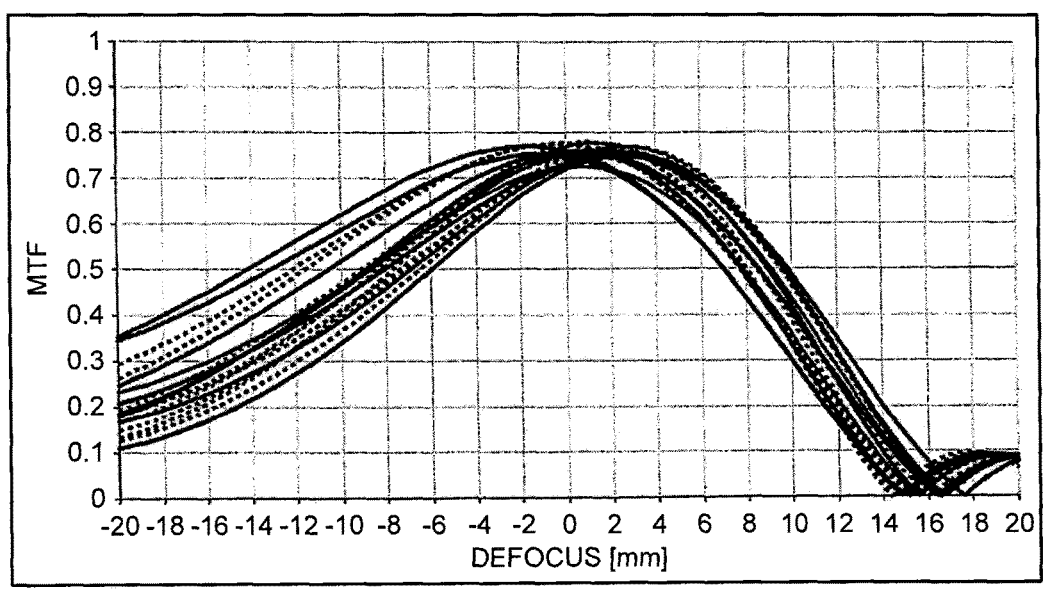
FIG. 20 is a diagram illustrating field curvature of Example 5.
Figure 21:
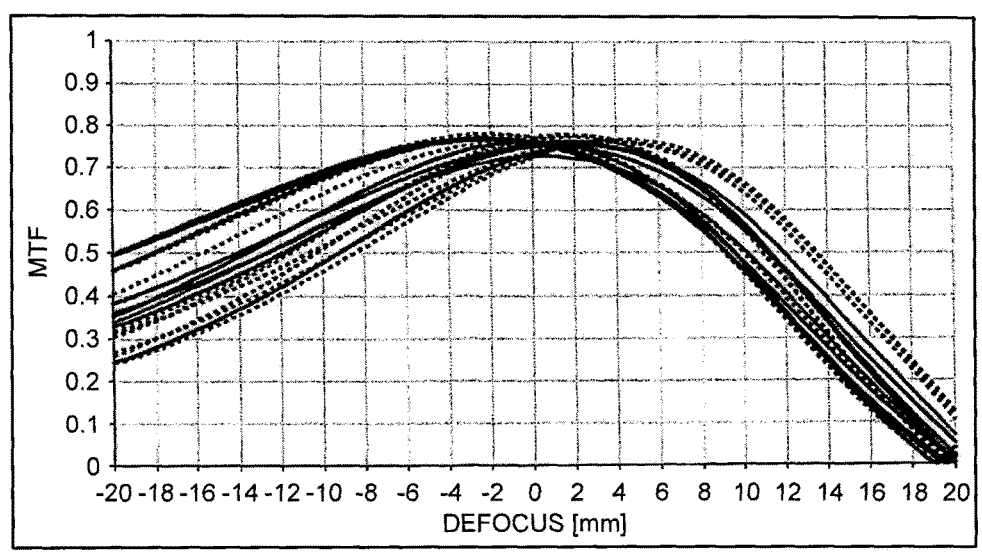
FIG. 21 is a diagram illustrating field curvature of Example 6.
Figure 22:
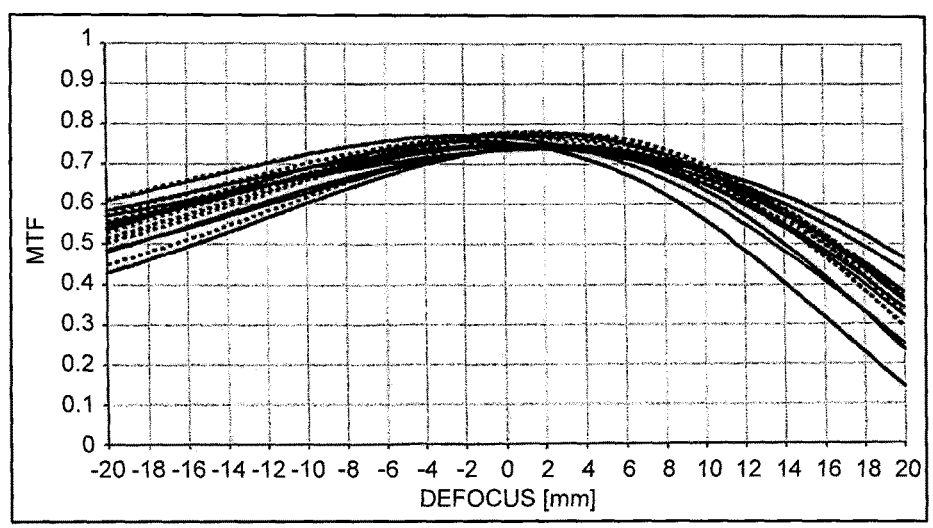
FIG. 22 is a diagram illustrating field curvature of Example 7.
Figure 23:
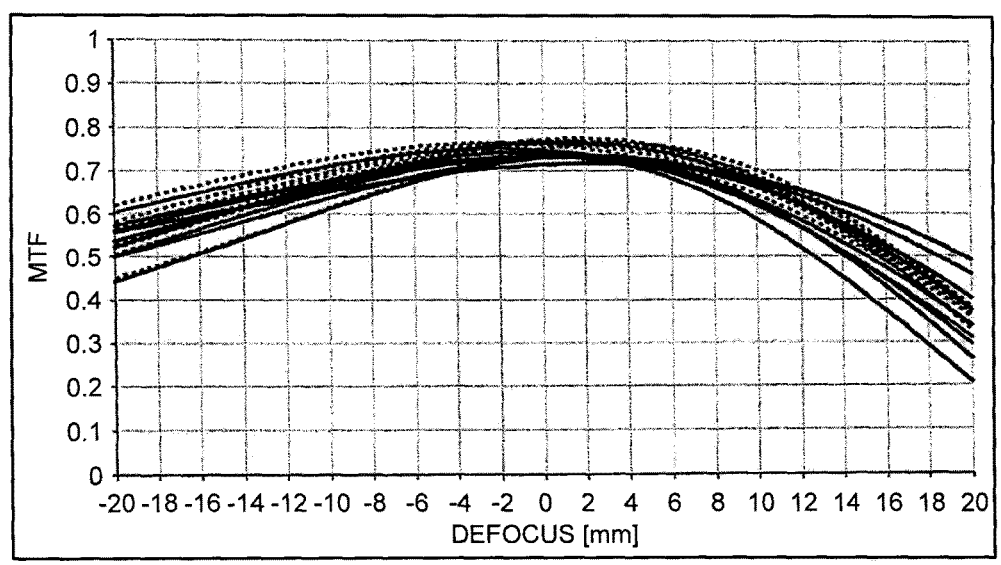
FIG. 23 is a diagram illustrating field curvature of Example 8.
Figure 24:
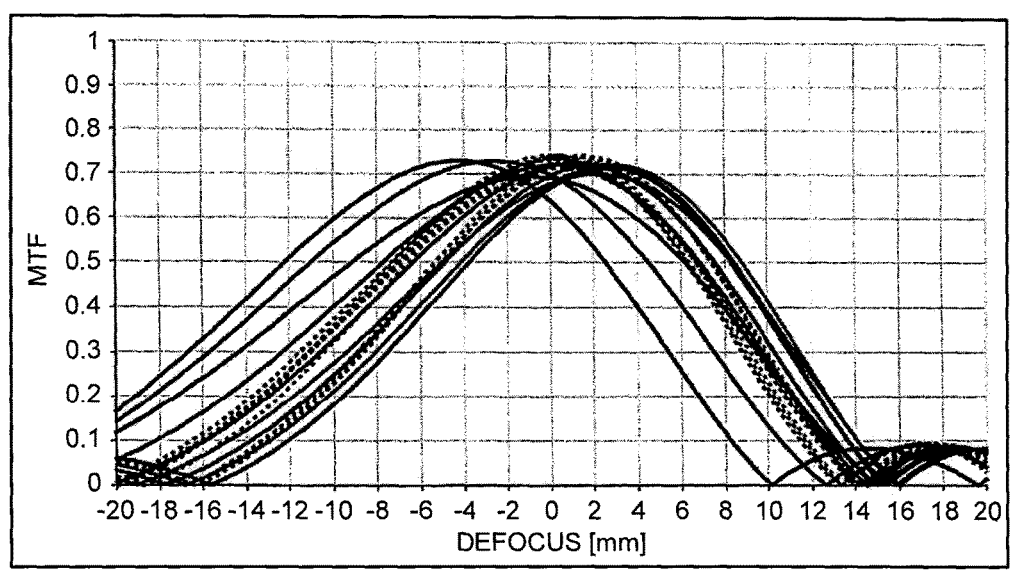
FIG. 24 is a diagram illustrating field curvature of Example 9.
Figure 25:
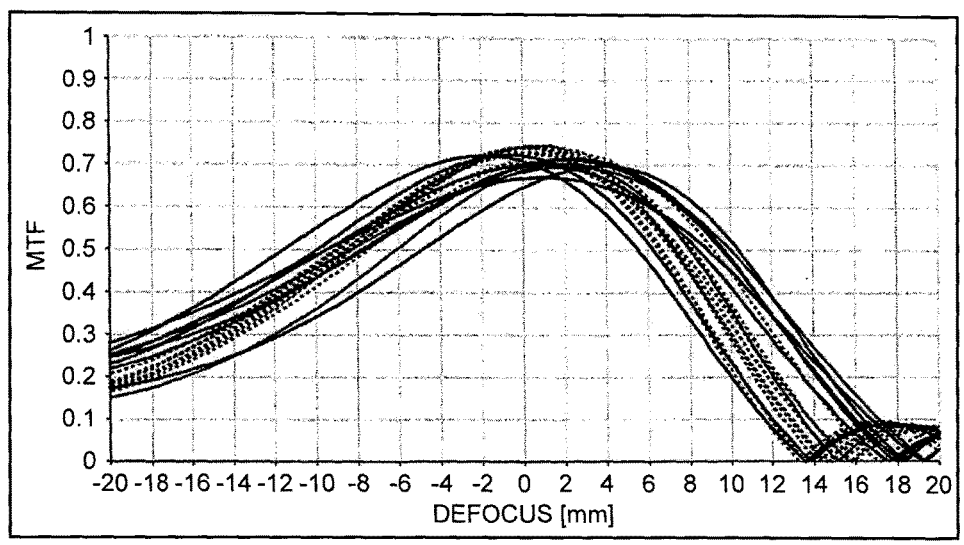
FIG. 25 is a diagram illustrating field curvature of Example 10.
Figure 26:
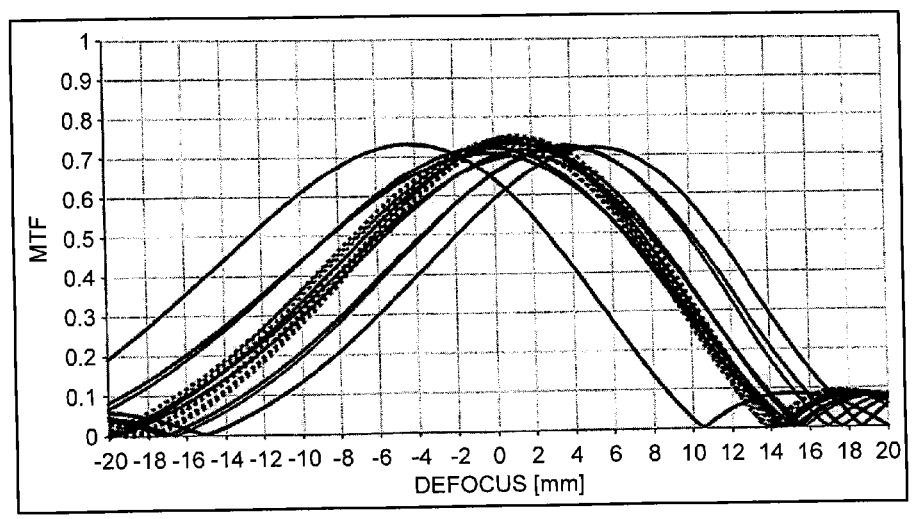
FIG. 26 is a diagram illustrating field curvature of Example 11.
Figure 27:
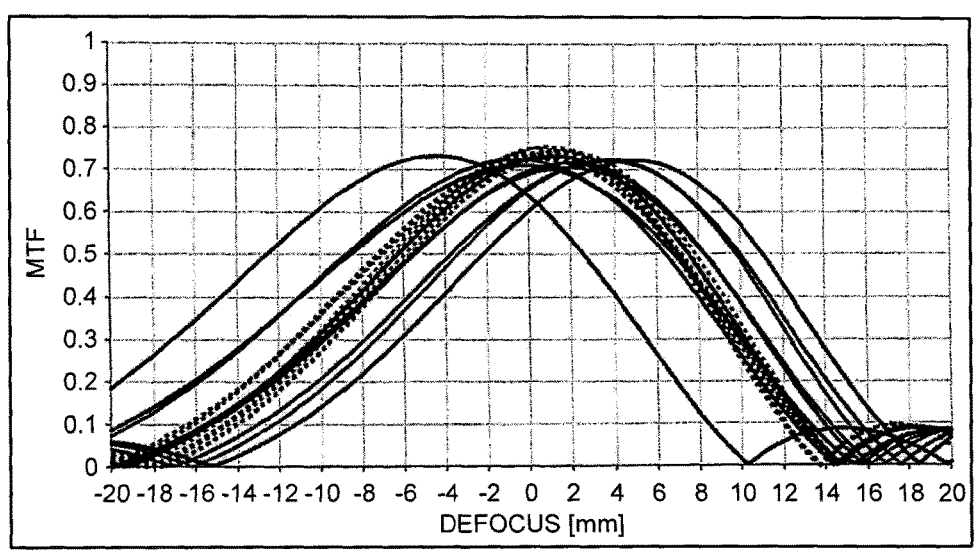
FIG. 27 is a diagram illustrating field curvature of Example 12.
Figure 28:
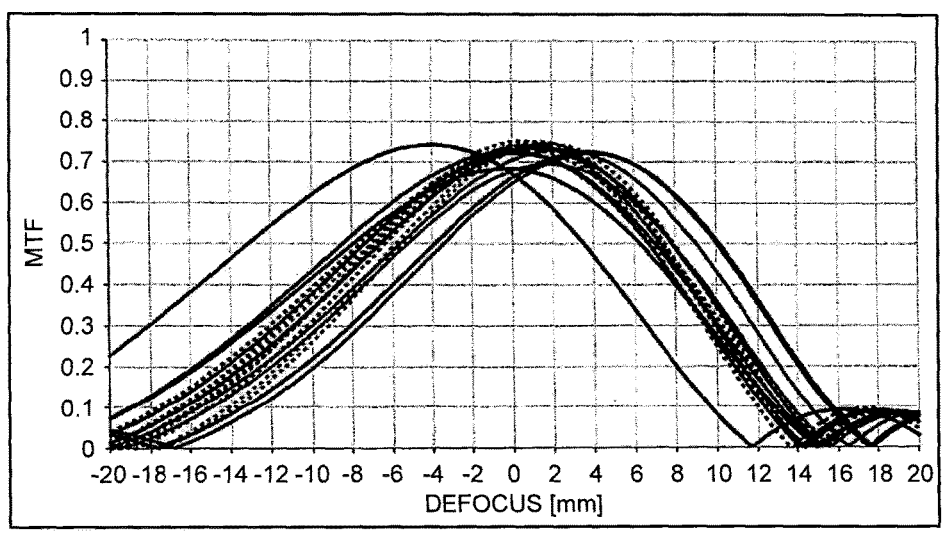
FIG. 28 is a diagram illustrating field curvature of Example 13.
Figure 29:
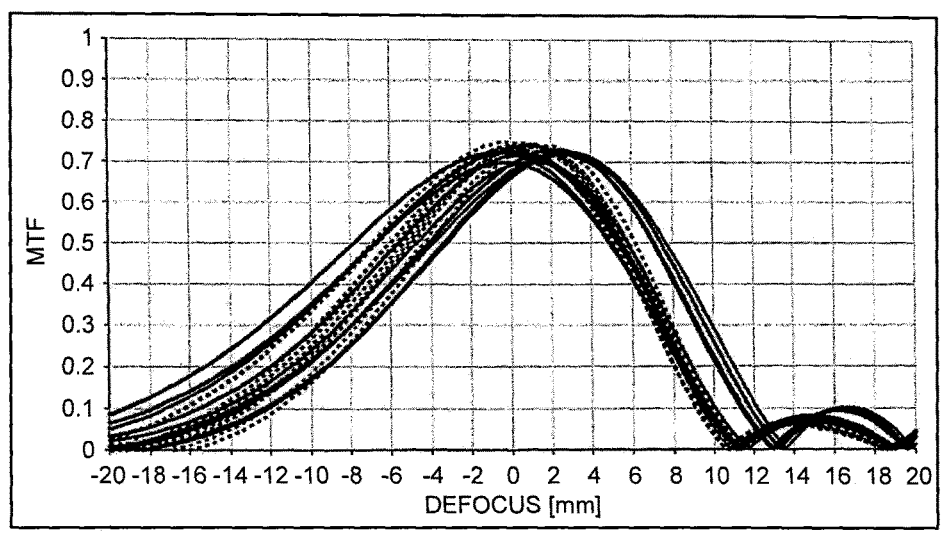
FIG. 29 is a diagram illustrating field curvature of Example 14.
Figure 30:
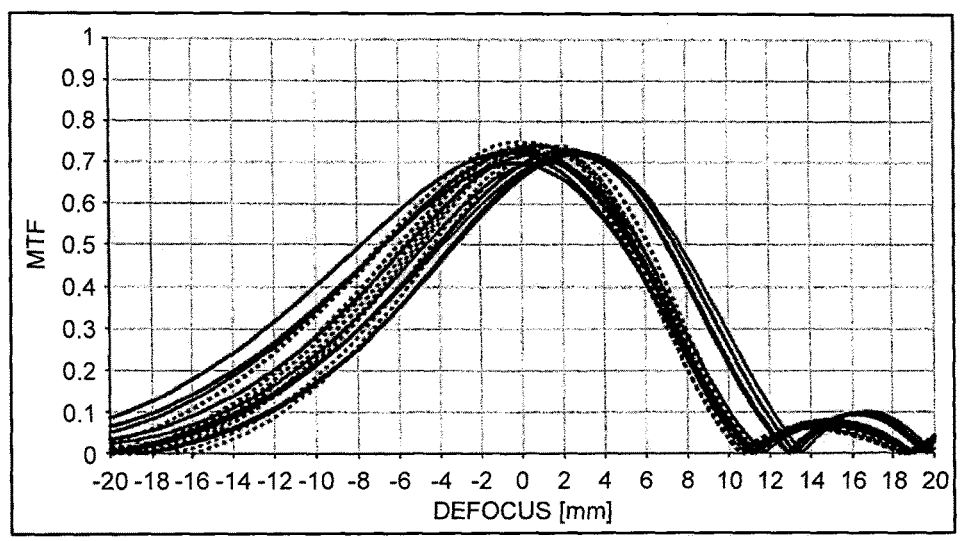
FIG. 30 is a diagram illustrating field curvature of Example 15.
Figure 31:
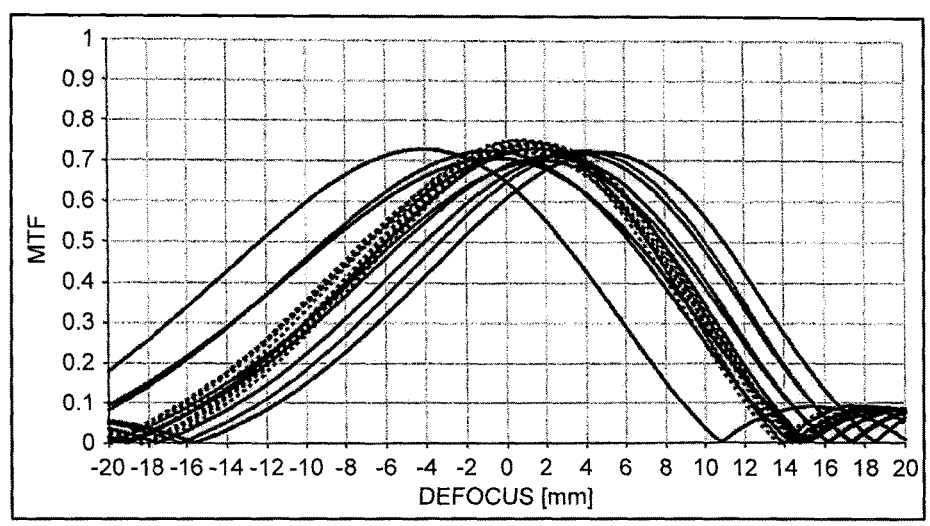
FIG. 31 is a diagram illustrating field curvature of Example 16.
Figure 32:
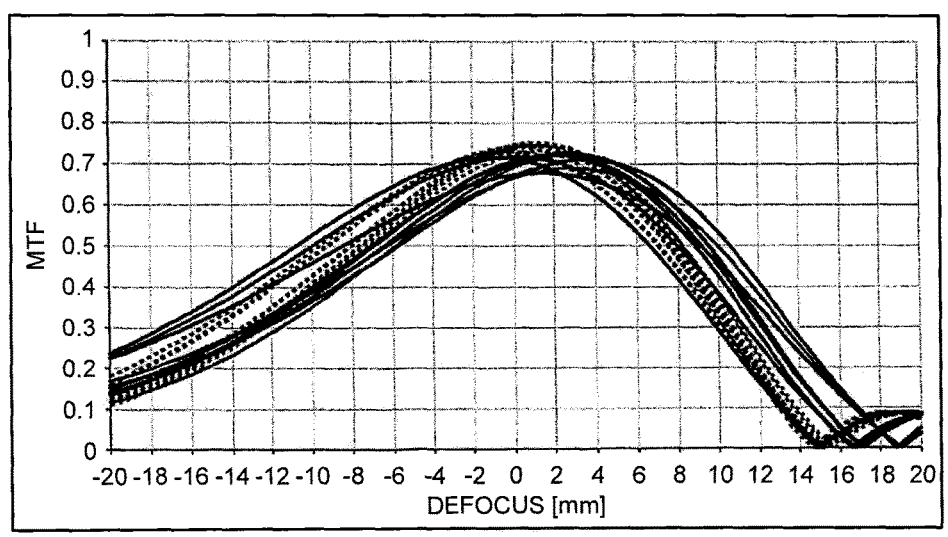
FIG. 32 is a diagram illustrating field curvature of Example 17.
Figure 33:
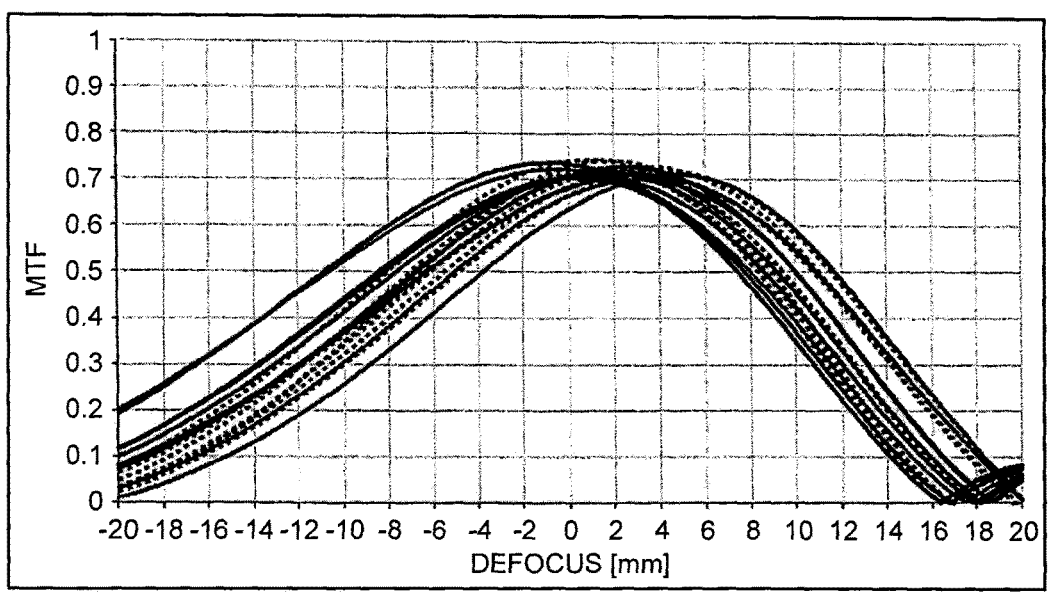
FIG. 33 is a diagram illustrating field curvature of Example 18.

In Examples 16 to 18, the curved screen 8 has a spherical shape (see (A) to (C) in FIG. 14). FIGS. 31 to 33 respectively illustrate MTF-defocus characteristics, which represent field curvature, of Examples 16 to 18.

Figure 34:
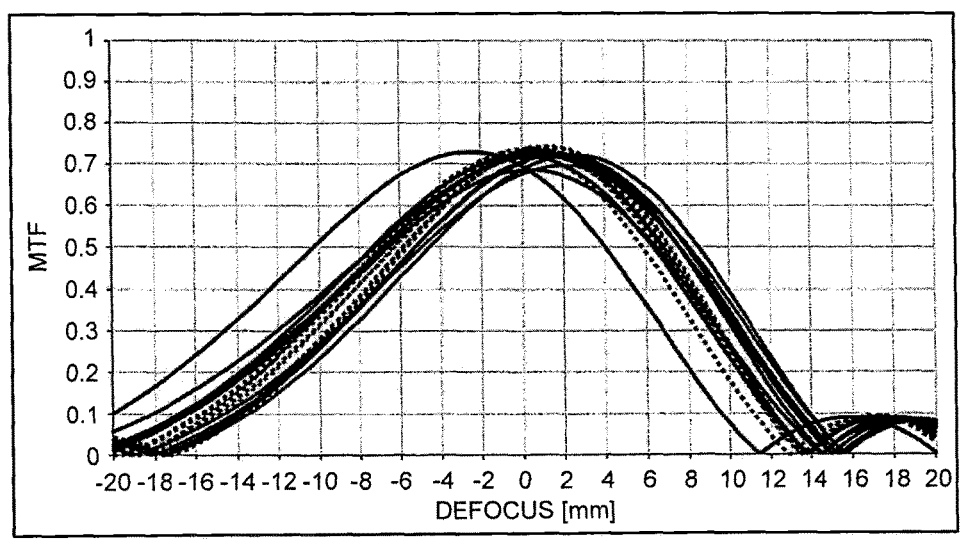
FIG. 34 is a diagram illustrating field curvature of Example 19.
Figure 35:
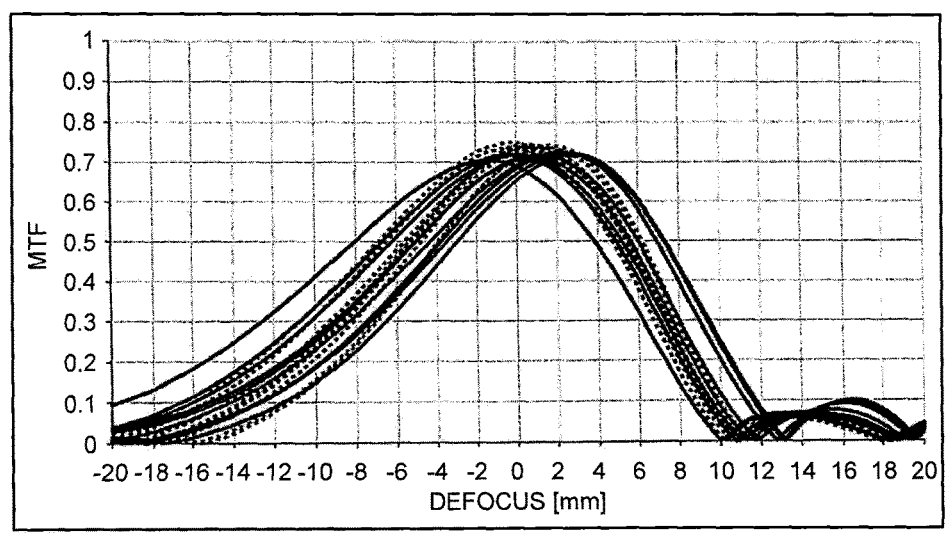
FIG. 35 is a diagram illustrating field curvature of Example 20.

In Examples 19 and 20, the curved screen 8 has a freeform surface shape. FIGS. 34 and 35 respectively illustrate MTF-defocus characteristics, which represent field curvature, of Examples 19 and 20.

It is indicated that field curvature is reduced by the use of the curved screen 8 in any one of Examples 1 to 20.

TABLE 1

|  | Example 1 | Example 2 | Example 3 | Example 4 |
|---|---|---|---|---|
| Shape of Transparent Member | Cylindrical | Cylindrical | Cylindrical | Cylindrical |
| R/L | 0.29 | 0.27 | 0.23 | 0.29 |
| β | 22.57 | 22.57 | 22.57 | 18.05 |
| β/R (1/mm) | 0.47 | 0.49 | 0.58 | 0.38 |
| α | 19.50 | 20.00 | 20.00 | 16.07 |
| α/R (1/mm) | 0.40 | 0.44 | 0.51 | 0.34 |
| Distance from Virtual Image to Observer's Eyes: Limg (mm) | 6000 | 6000 | 6000 | 5000 |
| Curvature Radius in Crosswise Direction of Transparent Member: R' (mm) | ∞ | ∞ | ∞ | ∞ |
| Curvature Radius in Lengthwise Direction of Transparent Member: R (mm) | 48.4 | 45.9 | 39.0 | 47.0 |
| R/R' | 0.0 | 0.0 | 0.0 | 0.0 |
| R/Limg | 0.008 | 0.008 | 0.007 | 0.009 |
| Optical Length from Intermediate Image Center to Concave Mirror (mm) | 168.1 | 167.5 | 167.1 | 164.4 |
| Size of Eye Box (mm) | 150 × 60 | 150 × 60 | 150 × 60 | 150 × 60 |
| Size of Intermediate Image (mm) | 32.7 × 16.1 | 32.7 × 15.7 | 32.7 × 15.7 | 33.9 × 16.3 |
| Size of Virtual Image (mm) | 738 × 314 | 738 × 314 | 738 × 314 | 612 × 262 |
| Incident Position on Concave Mirror of Light from Intermediate | Xm = −11.49 Ym = 8.63 | Xm = −7.37 Ym = 4.43 | Xm = −7.16 Ym = 3.88 | Xm = −7.19 Ym = 1.77 |

TABLE 1-continued

|  | Example 1 | Example 2 | Example 3 | Example 4 |
|---|---|---|---|---|
| Image Center (Xm, Ym) Coefficient of X-Y Polynomial Of Concave Mirror |  |  |  |  |
| Curvature: c | −0.005055 | −0.005080 | −0.005082 | −0.005076 |
| Conic Constant | 0.0 | 0.0 | 0.0 | 0.0 |
| X | 0.0 | 0.0 | 0.0 | 0.0 |
| Y | 0.0 | 0.0 | 0.0 | 0.0 |
| $X^2$ | 3.85149E−03 | 3.85715E−03 | 3.86023E−03 | 3.86845E−03 |
| XY | 7.43530E−05 | 8.13775E−05 | 7.97963E−05 | 7.87188E−05 |
| $Y^2$ | 3.67333E−03 | 3.69384E−03 | 3.69072E−03 | 3.70204E−03 |
| $X^3$ | −4.41850E−07 | −5.14269E−07 | −5.42264E−07 | −5.41254E−07 |
| $X^2Y$ | 9.51909E−07 | 9.82315E−07 | 1.00057E−06 | 1.01481E−06 |
| $XY^2$ | −2.37311E−07 | −2.96348E−07 | −3.00121E−07 | −2.30278E−07 |
| $Y^3$ | 7.78598E−07 | 6.46364E−07 | 6.44963E−07 | 6.61303E−07 |
| $X^4$ | 1.78893E−08 | 1.81332E−08 | 1.80183E−08 | 1.78668E−08 |
| $X^3Y$ | −4.00035E−10 | −1.25281E−09 | −1.34424E−09 | −9.01167E−10 |
| $X^2Y^2$ | 3.35637E−08 | 3.56877E−08 | 3.58023E−08 | 3.51752E−08 |
| $XY^3$ | 1.00319E−09 | 8.23345E−10 | 8.88121E−10 | 2.95957E−09 |
| $Y^4$ | 1.66347E−08 | 2.38070E−08 | 2.37062E−08 | 2.27882E−08 |
| $X^5$ | 7.36514E−12 | 6.39811E−12 | 6.21917E−12 | 9.73548E−12 |
| $X^4Y$ | 1.81527E−11 | 1.50576E−11 | 1.50734E−11 | 1.16628E−11 |
| $X^3Y^2$ | 4.88633E−12 | 5.84570E−13 | −8.52693E−13 | −8.84479E−12 |
| $X^2Y^3$ | 1.08785E−11 | 2.59115E−11 | 2.47945E−11 | 3.49627E−11 |
| $XY^4$ | 1.39165E−11 | 2.87189E−11 | 3.02440E−11 | 1.03420E−11 |
| $Y^5$ | −3.74390E−11 | 8.16819E−11 | 8.04893E−11 | 8.42661E−11 |
| $X^6$ | 8.08516E−14 | 1.00118E−13 | 1.00492E−13 | 1.03547E−13 |
| $X^5Y$ | 1.03525E−14 | 4.35043E−14 | 4.43589E−14 | 2.49157E−14 |
| $X^4Y^2$ | 5.39182E−13 | 2.36444E−13 | 2.35965E−13 | 2.66231E−13 |
| $X^3Y^3$ | 1.08253E−13 | 4.00848E−13 | 4.09679E−13 | 1.91085E−13 |
| $X^2Y^4$ | 4.89330E−13 | 3.56333E−13 | 3.62684E−13 | 5.77421E−13 |
| $XY^5$ | −1.01816E−12 | −1.46146E−12 | −1.46793E−12 | −1.79239E−12 |
| $Y^6$ | −2.07046E−13 | −1.53321E−12 | −1.53162E−12 | −1.46362E−12 |
| $X^7$ | −3.42576E−16 | −3.01953E−16 | −2.56525E−16 | −4.22799E−16 |
| $X^6Y$ | −5.63890E−16 | −5.23213E−16 | −5.14919E−16 | −3.64085E−16 |
| $X^5Y^2$ | −4.55989E−16 | −1.14628E−16 | 1.96112E−18 | 2.28543E−16 |
| $X^4Y^3$ | −1.05356E−16 | −7.13277E−16 | −7.81661E−16 | −7.92922E−16 |
| $X^3y^4$ | −1.05081E−15 | −1.95172E−15 | −2.12453E−15 | −1.22913E−15 |
| $X^2Y^5$ | −3.30057E−15 | −4.75593E−15 | −4.85860E−15 | −6.29941E−15 |
| $XY^6$ | −6.50775E−15 | −8.22289E−15 | −8.15139E−15 | −7.05798E−15 |
| $Y^7$ | −6.99823E−16 | −1.44808E−14 | −1.47219E−14 | −1.55747E−14 |
| $X^8$ | 8.94365E−18 | 8.30839E−18 | 8.36445E−18 | 8.14313E−18 |
| $X^7Y$ | −1.32824E−18 | −1.50956E−18 | −1.33897E−18 | −1.11091E−18 |
| $X^6Y^2$ | 2.98014E−17 | 4.39937E−17 | 4.38085E−17 | 4.37268E−17 |
| $X^5Y^3$ | −2.32432E−18 | −1.65343E−17 | −1.64299E−17 | −1.30678E−17 |
| $X^4Y^4$ | 2.67004E−17 | 1.95465E−17 | 2.12425E−17 | 1.24697E−17 |
| $X^3Y^5$ | −3.14431E−17 | −3.04182E−17 | −2.84176E−17 | −8.40563E−18 |
| $X^2Y^6$ | 1.00706E−16 | 1.39642E−16 | 1.38129E−16 | 1.00562E−16 |
| $XY^7$ | 2.60025E−16 | 2.90606E−16 | 2.89846E−16 | 2.78561E−16 |
| $Y^8$ | 5.60717E−17 | 1.67932E−16 | 1.68653E−16 | 1.61065E−16 |

TABLE 2

|  | Example 5 | Example 6 | Example 7 | Example 8 |
|---|---|---|---|---|
| Shape of Transparent Member | Cylindrical | Cylindrical | Cylindrical | Cylindrical |
| R/L | 0.31 | 0.35 | 0.52 | 0.61 |
| β | 13.93 | 9.00 | 4.72 | 4.50 |
| β/R (1/mm) | 0.29 | 0.17 | 0.07 | 0.06 |
| α | 12.37 | 8.05 | 4.10 | 3.93 |
| α/R (1/mm) | 0.25 | 0.15 | 0.06 | 0.05 |
| Distance from Virtual Image to Observer's Eyes: Limg (mm) | 4000 | 3000 | 2000 | 2000 |

TABLE 2-continued

| | Example 5 | Example 6 | Example 7 | Example 8 |
|---|---|---|---|---|
| Curvature Radius in Crosswise Direction of Transparent Member: R' (mm) | ∞ | ∞ | ∞ | ∞ |
| Curvature Radius in Lengthwise Direction of Transparent Member: R (mm) | 48.5 | 53.2 | 66.0 | 80.0 |
| R/R' | 0.0 | 0.0 | 0.0 | 0.0 |
| R/Limg | 0.012 | 0.018 | 0.033 | 0.040 |
| Optical Length from Intermediate Image Center to Concave Mirror (mm) | 154.9 | 151.8 | 126.8 | 131.1 |
| Size of Eye Box (mm) | 150 × 60 | 150 × 60 | 150 × 60 | 150 × 60 |
| Size of Intermediate Image (mm) | 35.1 × 16.9 | 40.8 × 19.5 | 51.9 × 25.6 | 54.4 × 26.7 |
| Size of Virtual Image (mm) | 489 × 209 | 367 × 157 | 245 × 105 | 245 × 105 |
| Incident Position on Concave Mirror of Light from Intermediate Image Center (Xm, Ym) | Xm = −8.04 Ym = 1.60 | Xm = −12.30 Ym = 6.10 | Xm = −20.87 Ym = 5.33 | Xm = −19.85 Ym = 5.56 |
| Coefficient of X-Y Polynomial Of Concave Mirror | | | | |
| Curvature: c | −0.005148 | −0.005205 | −0.005982 | −0.006011 |
| Conic Constant | 0.0 | 0.0 | 0.0 | 0.0 |
| X | 0.0 | 0.0 | 0.0 | 0.0 |
| Y | 0.0 | 0.0 | 0.0 | 0.0 |
| $X^2$ | 3.96663E−03 | 3.93430E−03 | 4.40590E−03 | 4.34354E−03 |
| XY | 8.03422E−05 | 9.23478E−05 | 1.80942E−04 | 1.63344E−04 |
| $Y^2$ | 3.78468E−03 | 3.74554E−03 | 4.08188E−03 | 4.04864E−03 |
| $X^3$ | −5.73837E−07 | −6.85299E−07 | −9.67068E−07 | −8.35864E−07 |
| $X^2Y$ | 1.10164E−06 | 1.30988E−06 | 1.80144E−06 | 1.60684E−06 |
| $XY^2$ | −2.88327E−07 | −1.63548E−07 | −9.97006E−07 | −9.69866E−07 |
| $Y^3$ | 7.43548E−07 | 8.79091E−07 | 5.51635E−07 | 3.65058E−07 |
| $X^4$ | 1.85520E−08 | 2.13987E−08 | 3.06336E−08 | 3.09600E−08 |
| $X^3Y$ | −6.10210E−10 | 1.64561E−09 | −8.58582E−10 | −7.94774E−10 |
| $X^2Y^2$ | 3.56107E−08 | 3.57728E−08 | 5.67488E−08 | 5.75025E−08 |
| $XY^3$ | 3.27060E−09 | 6.43502E−09 | −3.21151E−09 | −4.79754E−09 |
| $Y^4$ | 2.30977E−08 | 2.19181E−08 | 3.88165E−08 | 3.88321E−08 |
| $X^5$ | 1.15769E−11 | 2.74566E−11 | 2.73754E−11 | 2.99985E−11 |
| $X^4Y$ | 1.76652E−11 | −1.13771E−11 | 1.49698E−11 | 7.60898E−12 |
| $X^3Y^2$ | −4.39619E−12 | −3.63804E−11 | 7.54390E−11 | 5.96955E−11 |
| $X^2Y^3$ | 2.65010E−11 | 6.22592E−12 | −1.65410E−10 | −1.45759E−10 |
| $XY^4$ | −3.23847E−12 | −1.35687E−11 | 1.11410E−10 | 1.35645E−10 |
| $Y^5$ | 6.69708E−11 | 3.19372E−11 | 3.51759E−10 | 3.23957E−10 |
| $X^6$ | 1.31769E−13 | −6.04558E−14 | 1.56163E−14 | 4.77147E−14 |
| $X^5Y$ | −2.45598E−14 | −2.87901E−13 | −2.46830E−13 | −2.44507E−13 |
| $X^4Y^2$ | 3.37868E−14 | 4.24487E−13 | 1.14584E−12 | 1.18723E−12 |
| $X^3Y^3$ | 7.02253E−14 | −4.59378E−13 | 5.81746E−13 | 7.17925E−13 |
| $X^2Y^4$ | 8.84250E−13 | 1.45829E−12 | 7.49913E−13 | 4.26834E−13 |
| $XY^5$ | −1.71014E−12 | −1.95105E−12 | 2.55017E−12 | 2.77824E−12 |
| $Y^6$ | −1.45388E−12 | −1.61523E−12 | −7.98609E−13 | −7.69309E−13 |
| $X^7$ | −5.55481E−16 | −1.35373E−15 | −2.65838E−15 | −3.13955E−15 |
| $X^6Y$ | −6.78159E−16 | 4.01567E−16 | −6.70167E−15 | −6.71417E−15 |
| $X^5Y^2$ | −9.71150E−17 | 1.84757E−15 | −7.45892E−15 | −6.64988E−15 |
| $X^4Y^3$ | −8.14565E−16 | 2.56004E−15 | 3.79304E−14 | 3.72588E−14 |
| $X^3y^4$ | −4.25295E−16 | 3.92143E−16 | 2.38648E−14 | 2.08032E−14 |

TABLE 2-continued

|  | Example 5 | Example 6 | Example 7 | Example 8 |
|---|---|---|---|---|
| $X^2Y^5$ | −4.25101E−15 | −1.02517E−14 | −4.30889E−14 | −4.34560E−14 |
| $XY^6$ | −5.41013E−15 | −1.14911E−14 | −9.07797E−14 | −8.92287E−14 |
| $Y^7$ | −1.40196E−14 | −1.38605E−14 | −8.56546E−14 | −8.53997E−14 |
| $X^8$ | 7.89492E−18 | 1.28786E−17 | 2.77040E−17 | 2.61205E−17 |
| $X^7Y$ | 8.06012E−19 | 9.24617E−18 | −2.71592E−17 | −2.84714E−17 |
| $X^6Y^2$ | 4.68022E−17 | 5.11540E−17 | 4.09615E−17 | 3.76352E−17 |
| $X^5Y^3$ | −1.55413E−17 | 1.05222E−17 | 1.61709E−16 | 1.57992E−16 |
| $X^4Y^4$ | 1.15999E−17 | −5.63619E−18 | 6.25697E−16 | 6.28328E−16 |
| $X^3Y^5$ | 2.23706E−17 | 3.97233E−17 | −3.23510E−16 | −3.46930E−16 |
| $X^2Y^6$ | 7.60353E−17 | 4.13521E−18 | −1.27431E−15 | −1.11816E−15 |
| $XY^7$ | 2.14111E−16 | 2.01365E−16 | −1.28955E−15 | −1.21386E−15 |
| $Y^8$ | 1.52096E−16 | 2.26110E−16 | −1.89688E−16 | −2.96129E−16 |

TABLE 3

|  | Example 9 | Example 10 | Example 11 | Example 12 |
|---|---|---|---|---|
| Shape of Transparent Member | Cylindrical | Cylindrical | Toroidal | Toroidal |
| R/L | 0.21 | 1.61 | 0.53 | 0.48 |
| β | 21.72 | 6.57 | 20.91 | 21.03 |
| β/R (1/mm) | 0.51 | 0.03 | 0.19 | 0.21 |
| α | 19.50 | 6.70 | 19.03 | 19.15 |
| α/R (1/mm) | 0.45 | 0.03 | 0.17 | 0.19 |
| Distance from Virtual Image to Observer's Eyes: Limg (mm) | 6000 | 2000 | 6000 | 6000 |
| Curvature Radius in Crosswise Direction of Transparent Member: R' (mm) | ∞ | ∞ | 78.6 | 113.0 |
| Curvature Radius in Lengthwise Direction of Transparent Member: R (mm) | 43.0 | 200.0 | 112.0 | 100.0 |
| R/R' | 0.0 | 0.0 | 1.42 | 0.89 |
| R/Limg | 0.007 | 0.100 | 0.019 | 0.017 |
| Optical Length from Intermediate Image Center to Concave Mirror (mm) | 205.0 | 124.0 | 209.6 | 208.7 |
| Size of Eye Box (mm) | 130 × 60 | 130 × 60 | 130 × 60 | 130 × 60 |
| Size of Intermediate Image (mm) | 33.8 × 16.1 | 38.8 × 18.5 | 35.1 × 16.5 | 34.9 × 16.4 |
| Size of Virtual Image (mm) | 734 × 314 | 255 × 124 | 734 × 314 | 734 × 314 |
| Incident Position on Concave Mirror of Light from Intermediate Image Center (Xm, Ym) | Xm = 64.62 Ym = 40.36 | Xm = 27.00 Ym = −11.50 | Xm = 58.72 Ym = 32.73 | Xm = 57.20 Ym = 33.21 |
| Coefficient of X-Y |  |  |  |  |

TABLE 3-continued

|  | Example 9 | Example 10 | Example 11 | Example 12 |
|---|---|---|---|---|
| Polynomial Of Concave Mirror |  |  |  |  |
| Curvature: c | 0.0 | 0.0 | 0.0 | 0.0 |
| Conic Constant | 0.0 | 0.0 | 0.0 | 0.0 |
| X | 0.0 | 0.0 | 0.0 | 0.0 |
| Y | 0.0 | 0.0 | 0.0 | 0.0 |
| $X^2$ | 1.01996E−03 | 1.58341E−03 | 9.97659E−04 | 1.00492E−03 |
| XY | −1.73889E−04 | 2.42297E−04 | −1.90043E−04 | −1.87129E−04 |
| $Y^2$ | 8.85353E−04 | 1.44201E−03 | 8.89156E−04 | 8.91608E−04 |
| $X^3$ | 4.03978E−07 | 1.94344E−07 | 3.53907E−07 | 3.52307E−07 |
| $X^2Y$ | 7.26428E−07 | −2.01528E−06 | 7.03382E−07 | 7.14016E−07 |
| $XY^2$ | 1.52804E−07 | 4.70545E−07 | 2.14545E−07 | 2.15831E−07 |
| $Y^3$ | 5.66088E−07 | 1.01745E−06 | 2.68655E−07 | 2.93017E−07 |
| $X^4$ | −2.65082E−10 | −1.07338E−10 | 1.58648E−10 | 1.30512E−10 |
| $X^3Y$ | −1.20163E−09 | 1.80354E−08 | −4.72599E−10 | −5.12888E−10 |
| $X^2Y^2$ | −5.24393E−10 | −1.76095E−08 | −1.22861E−09 | −1.05960E−09 |
| $XY^3$ | 3.55470E−10 | 1.55069E−08 | −3.00780E−09 | −2.79858E−09 |
| $Y^4$ | −9.08460E−09 | −7.17376E−10 | −9.83006E−09 | −9.77258E−09 |
| $X^5$ | 5.31228E−12 | 2.76756E−11 | 5.91625E−12 | 5.83899E−12 |
| $X^4Y$ | 7.58566E−12 | −2.08885E−10 | −5.60856E−12 | −5.67646E−12 |
| $X^3Y^2$ | 2.18300E−11 | 6.47493E−10 | 2.78211E−11 | 2.55820E−11 |
| $X^2Y^3$ | 9.98665E−12 | −6.86498E−10 | 2.78884E−11 | 2.60270E−11 |
| $XY^4$ | 2.58899E−11 | 4.53618E−10 | 6.44148E−11 | 6.13414E−11 |
| $Y^5$ | 1.08873E−10 | −9.18458E−11 | 1.58048E−10 | 1.52056E−10 |
| $X^6$ | −1.24978E−14 | −1.55720E−13 | −1.56625E−14 | −1.43514E−14 |
| $X^5Y$ | −3.42946E−15 | 9.73284E−13 | 4.29933E−14 | 4.49859E−14 |
| $X^4Y^2$ | −4.65223E−14 | −4.22700E−12 | −7.54502E−14 | −6.63653E−14 |
| $X^3Y^3$ | −7.64492E−14 | 6.25429E−12 | −8.32046E−14 | −7.20701E−14 |
| $X^2Y^4$ | −7.28115E−15 | −6.27807E−12 | −9.48832E−14 | −9.24739E−14 |
| $XY^5$ | −1.01526E−13 | 3.02208E−12 | −2.65694E−13 | −2.51291E−13 |
| $Y^6$ | −5.07526E−13 | −6.17043E−13 | −8.09883E−13 | −7.62588E−13 |
| $X^7$ | 0.00000E+00 | 0.00000E+00 | 0.00000E+00 | 0.00000E+00 |
| $X^6Y$ | 0.00000E+00 | 0.00000E+00 | 0.00000E+00 | 0.00000E+00 |
| $X^5Y^2$ | 0.00000E+00 | 0.00000E+00 | 0.00000E+00 | 0.00000E+00 |
| $X^4Y^3$ | 0.00000E+00 | 0.00000E+00 | 0.00000E+00 | 0.00000E+00 |
| $X^3y^4$ | 0.00000E+00 | 0.00000E+00 | 0.00000E+00 | 0.00000E+00 |
| $X^2Y^5$ | 0.00000E+00 | 0.00000E+00 | 0.00000E+00 | 0.00000E+00 |
| $XY^6$ | 0.00000E+00 | 0.00000E+00 | 0.00000E+00 | 0.00000E+00 |
| $Y^7$ | 0.00000E+00 | 0.00000E+00 | 0.00000E+00 | 0.00000E+00 |
| $X^8$ | 0.00000E+00 | 0.00000E+00 | 0.00000E+00 | 0.00000E+00 |
| $X^7Y$ | 0.00000E+00 | 0.00000E+00 | 0.00000E+00 | 0.00000E+00 |
| $X^6Y^2$ | 0.00000E+00 | 0.00000E+00 | 0.00000E+00 | 0.00000E+00 |
| $X^5Y^3$ | 0.00000E+00 | 0.00000E+00 | 0.00000E+00 | 0.00000E+00 |
| $X^4Y^4$ | 0.00000E+00 | 0.00000E+00 | 0.00000E+00 | 0.00000E+00 |
| $X^3Y^5$ | 0.00000E+00 | 0.00000E+00 | 0.00000E+00 | 0.00000E+00 |
| $X^2Y^6$ | 0.00000E+00 | 0.00000E+00 | 0.00000E+00 | 0.00000E+00 |
| $XY^7$ | 0.00000E+00 | 0.00000E+00 | 0.00000E+00 | 0.00000E+00 |
| $Y^8$ | 0.00000E+00 | 0.00000E+00 | 0.00000E+00 | 0.00000E+00 |

TABLE 4

|  | Example 13 | Example 14 | Example 15 | Example 16 |
|---|---|---|---|---|
| Shape of Transparent Member | Toroidal | Toroidal | Toroidal | Spherical |
| R/L | 0.29 | 0.42 | 0.39 | 0.46 |
| β | 21.15 | 11.92 | 7.81 | 20.91 |
| β/R (1/mm) | 0.35 | 0.20 | 0.16 | 0.22 |
| α | 19.15 | 10.83 | 6.80 | 19.03 |
| α/R (1/mm) | 0.32 | 0.18 | 0.14 | 0.20 |
| Distance from Virtual Image to Observer's Eyes: Limg (mm) | 6000 | 6000 | 2000 | 6000 |

TABLE 4-continued

| | Example 13 | Example 14 | Example 15 | Example 16 |
|---|---|---|---|---|
| Curvature Radius in Crosswise Direction of Transparent Member: R' (mm) | 41.5 | 29.4 | 24.3 | 96.4 |
| Curvature Radius in Lengthwise Direction of Transparent Member: R (mm) | 60.0 | 59.4 | 48.6 | 96.4 |
| R/R' | 1.45 | 2.02 | 2.00 | 1.00 |
| R/Limg | 0.010 | 0.010 | 0.024 | 0.016 |
| Optical Length from Intermediate Image Center to Concave Mirror (mm) | 208.0 | 140.0 | 124.0 | 210.0 |
| Size of Eye Box (mm) | 130 × 60 | 130 × 60 | 130 × 60 | 130 × 60 |
| Size of Intermediate Image (mm) | 34.7 × 16.4 | 30.8 × 14.5 | 26.9 × 12.8 | 35.1 × 16.5 |
| Size of Virtual Image (mm) | 734 × 314 | 367 × 157 | 210 × 87 | 734 × 314 |
| Incident Position on Concave Mirror of Light from Intermediate Image Center (Xm, Ym) | Xm = 67.40 Ym = 28.16 | Xm = 16.00 Ym = −21.00 | Xm = −13.95 Ym = 8.11 | Xm = 51.66 Ym = 39.09 |
| Coefficient of X-Y Polynomial Of Concave Mirror | | | | |
| Curvature: c | 0.0 | 0.0 | 0.0 | 0.0 |
| Conic Constant | 0.0 | 0.0 | 0.0 | 0.0 |
| X | 0.0 | 0.0 | 0.0 | 0.0 |
| Y | 0.0 | 0.0 | 0.0 | 0.0 |
| $X^2$ | 1.00118E−03 | 1.60772E−03 | 4.71102E−03 | 1.00168E−03 |
| XY | −1.80760E−04 | 1.24902E−05 | 3.45431E−04 | −1.76753E−04 |
| $Y^2$ | 8.89225E−04 | 1.39674E−03 | 4.76023E−03 | 8.74588E−04 |
| $X^3$ | 4.29761E−07 | −1.45149E−08 | −1.21038E−06 | 3.17145E−07 |
| $X^2Y$ | 6.05658E−07 | 1.04100E−06 | 1.66566E−07 | 7.15538E−07 |
| $XY^2$ | 2.92771E−07 | 6.66820E−07 | −2.41189E−07 | 1.83956E−07 |
| $Y^3$ | 1.67751E−07 | 5.01012E−07 | 7.49345E−07 | 4.84592E−07 |
| $X^4$ | −1.54536E−10 | 1.92070E−09 | 3.31773E−08 | 4.18805E−10 |
| $X^3Y$ | −2.59590E−10 | 4.75575E−10 | −8.07322E−09 | −3.75275E−10 |
| $X^2Y^2$ | −6.32827E−10 | −1.84418E−09 | 7.20706E−08 | 1.03478E−10 |
| $XY^3$ | −2.49941E−09 | 1.06481E−08 | −3.88316E−09 | −1.58020E−09 |
| $Y^4$ | −7.09571E−09 | −8.68060E−09 | 3.44362E−08 | −1.14353E−08 |
| $X^5$ | 3.87529E−12 | 7.88560E−12 | −2.67898E−11 | 3.84522E−12 |
| $X^4Y$ | −1.60481E−12 | 5.12385E−12 | 1.16478E−10 | −5.36916E−12 |
| $X^3Y^2$ | 1.47263E−11 | 2.23857E−11 | −3.73958E−10 | 1.82494E−11 |
| $X^2Y^3$ | 2.93105E−11 | −5.57197E−11 | 5.45439E−10 | 9.20542E−12 |
| $XY^4$ | 5.71954E−11 | 1.44062E−10 | −3.60635E−10 | 4.24943E−11 |
| $Y^5$ | 1.37810E−10 | −1.54025E−10 | 8.23781E−11 | 1.49372E−10 |
| $X^6$ | −6.70921E−15 | −7.20196E−14 | 8.18720E−13 | −1.09772E−14 |
| $X^5Y$ | 2.39825E−14 | 1.93133E−15 | 1.90832E−12 | 4.17892E−14 |
| $X^4Y^2$ | −3.50701E−14 | −6.70802E−14 | −2.73778E−12 | −5.49255E−14 |
| $X^3Y^3$ | −6.93038E−14 | 8.29237E−14 | 1.04965E−11 | −3.55548E−14 |
| $X^2Y^4$ | −1.00513E−13 | −3.47306E−13 | −7.79858E−12 | −2.65835E−14 |
| $XY^5$ | −2.68016E−13 | 7.71361E−13 | 5.60329E−12 | −1.60814E−13 |
| $Y^6$ | −8.18838E−13 | −8.51252E−13 | −2.67861E−13 | −6.69723E−13 |
| $X^7$ | 0.00000E+00 | 0.00000E+00 | 0.00000E+00 | 0.00000E+00 |
| $X^6Y$ | 0.00000E+00 | 0.00000E+00 | 0.00000E+00 | 0.00000E+00 |
| $X^5Y^2$ | 0.00000E+00 | 0.00000E+00 | 0.00000E+00 | 0.00000E+00 |
| $X^4Y^3$ | 0.00000E+00 | 0.00000E+00 | 0.00000E+00 | 0.00000E+00 |
| $X^3y^4$ | 0.00000E+00 | 0.00000E+00 | 0.00000E+00 | 0.00000E+00 |

TABLE 4-continued

|  | Example 13 | Example 14 | Example 15 | Example 16 |
|---|---|---|---|---|
| $X^2Y^5$ | 0.00000E+00 | 0.00000E+00 | 0.00000E+00 | 0.00000E+00 |
| $XY^6$ | 0.00000E+00 | 0.00000E+00 | 0.00000E+00 | 0.00000E+00 |
| $Y^7$ | 0.00000E+00 | 0.00000E+00 | 0.00000E+00 | 0.00000E+00 |
| $X^8$ | 0.00000E+00 | 0.00000E+00 | 0.00000E+00 | 0.00000E+00 |
| $X^7Y$ | 0.00000E+00 | 0.00000E+00 | 0.00000E+00 | 0.00000E+00 |
| $X^6Y^2$ | 0.00000E+00 | 0.00000E+00 | 0.00000E+00 | 0.00000E+00 |
| $X^5Y^3$ | 0.00000E+00 | 0.00000E+00 | 0.00000E+00 | 0.00000E+00 |
| $X^4Y^4$ | 0.00000E+00 | 0.00000E+00 | 0.00000E+00 | 0.00000E+00 |
| $X^3Y^5$ | 0.00000E+00 | 0.00000E+00 | 0.00000E+00 | 0.00000E+00 |
| $X^2Y^6$ | 0.00000E+00 | 0.00000E+00 | 0.00000E+00 | 0.00000E+00 |
| $XY^7$ | 0.00000E+00 | 0.00000E+00 | 0.00000E+00 | 0.00000E+00 |
| $Y^8$ | 0.00000E+00 | 0.00000E+00 | 0.00000E+00 | 0.00000E+00 |

TABLE 5

|  | Example 17 | Example 18 | Example 19 | Example 20 |
|---|---|---|---|---|
| Shape of Transparent Member | Spherical | Spherical | Freeform Surface | Freeform Surface |
| R/L | 0.66 | 0.26 | — | — |
| β | 7.53 | 6.36 | 21.52 | — |
| β/R (1/mm) | 0.08 | 0.16 | — | — |
| α | 6.74 | 5.72 | 19.50 | — |
| α/R (1/mm) | 0.07 | 0.14 | — | — |
| Distance from Virtual Image to Observer's Eyes: Limg (mm) | 2300 | 2000 | 6000 | 3000 |
| Curvature Radius in Crosswise Direction of Transparent Member: R' (mm) | 92.1 | 40.0 | — | — |
| Curvature Radius in Lengthwise Direction of Transparent Member: R (mm) | 92.1 | 40.0 | — | — |
| R/R' | 1.00 | 1.00 | — | — |
| R/Limg | 0.040 | 0.020 | — | — |
| Optical Length from Intermediate Image Center to Concave Mirror (mm) | 139.5 | 152.4 | 205.2 | 139.3 |
| Size of Eye Box (mm) | 130 × 60 | 130 × 60 | 130 × 60 | 130 × 60 |
| Size of Intermediate Image (mm) | 37.3 × 17.8 | 33.0 × 15.2 | 34.1 × 16.1 | 30.6 × 14.5 |
| Size of Virtual Image (mm) | 281 × 20 | 210 × 87 | 734 × 314 | 367 × 157 |
| Incident Position on Concave Mirror of Light from Intermediate Image Center (Xm, Ym) | Xm = 42.00 Ym = −26.00 | Xm = −9.19 Ym = 6.97 | Xm = 62.04 Ym = 41.42 | Xm = 53.81 Ym = −16.18 |
| Coefficient of X-Y | | | | |

TABLE 5-continued

|  | Example 17 | Example 18 | Example 19 | Example 20 |
|---|---|---|---|---|
| Polynomial Of Concave Mirror |  |  |  |  |
| Curvature: c | 0.0 | −0.006113 | 0.0 | 0.0 |
| Conic Constant | 0.0 | 0.0 | 0.0 | 0.0 |
| X | 0.0 | 0.0 | 0.0 | 0.0 |
| Y | 0.0 | 0.0 | 0.0 | 0.0 |
| $X^2$ | 1.48919E−03 | 4.22840E−03 | 1.03759E−03 | 1.58969E−03 |
| XY | 1.44282E−04 | 2.95142E−04 | −1.62325E−04 | −7.95580E−05 |
| $Y^2$ | 1.23724E−03 | 4.28941E−03 | 8.84127E−04 | 1.37251E−03 |
| $X^3$ | 2.47771E−07 | −6.63201E−07 | 3.23676E−07 | 4.62133E−07 |
| $X^2Y$ | −4.17778E−09 | −1.99423E−07 | 7.30324E−07 | 1.03671E−06 |
| $XY^2$ | 2.05653E−06 | 2.80090E−07 | 2.30563E−07 | 1.02397E−06 |
| $Y^3$ | −1.17159E−08 | 2.46760E−07 | 5.71194E−07 | 6.21018E−07 |
| $X^4$ | 1.03205E−09 | 2.88037E−08 | −2.07343E−10 | −9.75745E−10 |
| $X^3Y$ | 2.86595E−10 | −1.11310E−08 | −2.22689E−10 | 1.31943E−09 |
| $X^2Y^2$ | −4.96137E−09 | 6.02669E−08 | −3.97892E−10 | −4.09761E−09 |
| $XY^3$ | 1.20278E−08 | −1.13966E−08 | −1.25406E−09 | 9.52924E−09 |
| $Y^4$ | −9.10440E−09 | 2.97760E−08 | −9.62382E−09 | −6.25353E−09 |
| $X^5$ | 1.20832E−11 | −1.15836E−11 | 5.23052E−12 | 2.90693E−11 |
| $X^4Y$ | 4.46159E−11 | 9.13166E−11 | −1.42095E−12 | −4.38172E−12 |
| $X^3Y^2$ | 9.46854E−12 | −2.80033E−10 | 1.31498E−11 | 5.60908E−11 |
| $X^2Y^3$ | −2.08575E−11 | 3.93596E−10 | 2.44974E−11 | −6.99793E−11 |
| $XY^4$ | 1.20012E−10 | −2.33947E−10 | 3.38137E−11 | 1.28607E−10 |
| $Y^5$ | −1.04460E−10 | 6.28998E−11 | 1.07493E−10 | −1.45499E−10 |
| $X^6$ | −5.25580E−14 | 4.91042E−13 | −1.19095E−14 | −8.58899E−14 |
| $X^5Y$ | −1.55199E−13 | 2.38854E−12 | 1.96605E−14 | 4.75166E−14 |
| $X^4Y^2$ | 5.26375E−14 | −3.60822E−12 | −2.69690E−14 | −1.15427E−13 |
| $X^3Y^3$ | −5.41397E−14 | 1.11799E−11 | −4.88450E−14 | 2.46674E−13 |
| $X^2Y^4$ | −2.82333E−13 | −7.01252E−12 | −1.30957E−13 | −3.96451E−13 |
| $XY^5$ | 6.89381E−13 | 4.86384E−12 | −7.99815E−14 | 7.19208E−13 |
| $Y^6$ | −4.55634E−13 | −1.66742E−13 | −4.52042E−13 | −8.86651E−13 |
| $X^7$ | 0.00000E+00 | 0.00000E+00 | 0.00000E+00 | 0.00000E+00 |
| $X^6Y$ | 0.00000E+00 | 0.00000E+00 | 0.00000E+00 | 0.00000E+00 |
| $X^5Y^2$ | 0.00000E+00 | 0.00000E+00 | 0.00000E+00 | 0.00000E+00 |
| $X^4Y^3$ | 0.00000E+00 | 0.00000E+00 | 0.00000E+00 | 0.00000E+00 |
| $X^3y^4$ | 0.00000E+00 | 0.00000E+00 | 0.00000E+00 | 0.00000E+00 |
| $X^2Y^5$ | 0.00000E+00 | 0.00000E+00 | 0.00000E+00 | 0.00000E+00 |
| $XY^6$ | 0.00000E+00 | 0.00000E+00 | 0.00000E+00 | 0.00000E+00 |
| $Y^7$ | 0.00000E+00 | 0.00000E+00 | 0.00000E+00 | 0.00000E+00 |
| $X^8$ | 0.00000E+00 | 0.00000E+00 | 0.00000E+00 | 0.00000E+00 |
| $X^7Y$ | 0.00000E+00 | 0.00000E+00 | 0.00000E+00 | 0.00000E+00 |
| $X^6Y^2$ | 0.00000E+00 | 0.00000E+00 | 0.00000E+00 | 0.00000E+00 |
| $X^5Y^3$ | 0.00000E+00 | 0.00000E+00 | 0.00000E+00 | 0.00000E+00 |
| $X^4Y^4$ | 0.00000E+00 | 0.00000E+00 | 0.00000E+00 | 0.00000E+00 |
| $X^3Y^5$ | 0.00000E+00 | 0.00000E+00 | 0.00000E+00 | 0.00000E+00 |
| $X^2Y^6$ | 0.00000E+00 | 0.00000E+00 | 0.00000E+00 | 0.00000E+00 |
| $XY^7$ | 0.00000E+00 | 0.00000E+00 | 0.00000E+00 | 0.00000E+00 |
| $Y^8$ | 0.00000E+00 | 0.00000E+00 | 0.00000E+00 | 0.00000E+00 |

TABLE 6

| Exemplary Parameters | | | | | | | | | | |
|---|---|---|---|---|---|---|---|---|---|---|
|  | Ex. 1 | Ex. 2 | Ex. 3 | Ex. 4 | Ex. 5 | Ex. 6 | Ex. 7 | Ex. 8 | Ex. 9 | Ex. 10 |
| R/L | 0.288 | 0.274 | 0.233 | 0.286 | 0.313 | 0.350 | 0.521 | 0.610 | 0.210 | 1.613 |
| β/R (1/mm) | 0.467 | 0.491 | 0.579 | 0.384 | 0.287 | 0.169 | 0.071 | 0.056 | 0.505 | 0.033 |
| α/R (1/mm) | 0.403 | 0.435 | 0.513 | 0.342 | 0.255 | 0.151 | 0.062 | 0.049 | 0.454 | 0.034 |
| R/Limg | 0.008 | 0.008 | 0.007 | 0.009 | 0.012 | 0.018 | 0.033 | 0.040 | 0.007 | 0.100 |
| R/R' | 0.000 | 0.000 | 0.000 | 0.000 | 0.000 | 0.000 | 0.000 | 0.000 | 0.000 | 0.000 |
|  | Ex. 11 | Ex. 12 | Ex. 13 | Ex. 14 | Ex. 15 | Ex. 16 | Ex. 17 | Ex. 18 | Ex. 19 | Ex. 20 |
| R/L | 0.534 | 0.479 | 0.288 | 0.424 | 0.392 | 0.459 | 0.660 | 0.268 | — | — |
| β/R (1/mm) | 0.187 | 0.210 | 0.353 | 0.201 | 0.161 | 0.217 | 0.082 | 0.159 | — | — |
| α/R (1/mm) | 0.170 | 0.191 | 0.319 | 0.182 | 0.140 | 0.197 | 0.073 | 0.143 | — | — |
| R/Limg | 0.019 | 0.017 | 0.010 | 0.010 | 0.024 | 0.016 | 0.040 | 0.020 | — | — |
| R/R' | 0.425 | 0.885 | 1.446 | 2.021 | 1.998 | 1.000 | 1.000 | 1.000 | — | — |

The head-up display described above can be used in a form of mounted on a vehicle such as an automobile, for example. When used as such, the "a" direction is "the lateral direction as viewed from driver's seat"; the "b" direction is "the longitudinal direction".

In this case, a "navigation image", for example, can be displayed as the enlarged virtual image I forward of the front windshield 10. A driver, who is the observer, can view the image from the driver's seat with his/her line of sight moved little away from forward of the front windshield 10.

In such a case, as described above, it is generally preferable that the displayed enlarged virtual image I be a "laterally-elongated image as viewed from the driver". Put another way, it is preferable that each of the image (intermediate image) formed on the microlens array and the enlarged virtual image I be an image having a wider angle of view in the "a" direction.

Furthermore, as described above, it is desired that the display image has a "wider angle of view in the lateral direction than in the longitudinal direction" so that the driver, who is the observer, can identify the display even when the driver views the image diagonally from right or left.

Accordingly, it is desired that the diffusion angle in the lengthwise direction (i.e., the "a" direction) of the enlarged virtual image I is wider than in the crosswise direction (i.e., the "b" direction) (anisotropic diffusion).

Thus, it is preferable to configure each of the convex microlenses of the convex microlens structure (microlens array) as an anamorphic lens having a larger curvature in the lengthwise direction of the intermediate image formed on the curved screen 8 or the enlarged virtual image I than in the crosswise direction, so that the lens has diffusion angles, with which pixel-displaying beams are to be diffused, which are "larger in the lateral direction of the intermediate image than in the longitudinal direction".

Diverging light to a minimum range satisfying an angle of view required by the head-up display device, increasing efficiency for light utilization, and increasing brightness of a displayed image can be achieved in this manner.

As a matter of course, diffusion of pixel-displaying beams is not necessarily such "anisotropic diffusion" as described above, but can be "isotropic diffusion" with a same diffusion angle in the longitudinal direction and in the lateral direction.

However, when an image is displayed by a head-up display mounted on a vehicle such as an automobile, a driver is less likely to view the displayed image from a vertically displaced position.

For this reason, it is preferable that the diffusion angles, with which pixel-displaying beams are to be diffused, be "wider in the lateral direction of the intermediate image than in the longitudinal direction" in terms of efficiency in light utilization.

It is conventionally known that a convex microlens can be formed to have an "aspherical surface" as its lens surface.

Although the anamorphic lens surface described immediately above is also an "aspherical surface", the lens surface of the convex microlens can be formed as a more general aspherical surface so as to correct aberration.

By correcting aberration, reduction in "unevenness in intensity of diffused light" can also be achieved.

The convex microlenses of the convex microlens structure diffuse pixel-displaying beams as described above. Alternatively, the pixel-displaying beams may be diffused only in one of the two directions (i.e., the x-direction and the y-direction).

In such a case, a "cylindrical convex microsurface" can be adopted as the lens surface of the convex microlens.

Meanwhile, it is conventionally known, in relation to methods for manufacturing microlens arrays, that a convex microlens may be formed in a hexagonal shape and that the convex microlenses may be arrayed in a honeycomb array.

The image display device 1000 (head-up display) of the embodiment described above includes the image forming unit configured to form an intermediate image (image) with light and cause the light, with which the image is formed, to exit the image forming unit, and the concave mirror 9 configured to reflect the light from the image forming unit toward the front windshield 10 (transparent reflecting member). The image forming unit includes a transparent member (the curved screen 8), on which the image is to be formed, bulging toward the concave mirror 9.

With this configuration, field curvature of a virtual image can be reduced without increasing the number of parts.

Hence, the image display device 1000 can increase visibility of the virtual image without upsizing the device.

Alternatively, an approach of (additionally) providing an optical element (e.g., a lens or a mirror) independently of the curved screen (or a flat screen) to reduce the field curvature of the virtual image can be taken. However, this approach disadvantageously increases the number of parts. This results in an increase in magnitude of influence of error, which can develop during manufacture and/or installation of the parts, on visibility of the virtual image and an increase in size of the device.

When the curved screen 8 has a cylindrical shape with a curvature in any one of the lengthwise direction and the crosswise direction, field curvature of the virtual image in the one of the lengthwise direction and the crosswise direction can be reduced. Accordingly, it is preferable that the curved screen 8 have a curvature in one direction, in which field curvature is more likely to occur, of the lengthwise direction and the crosswise direction of the virtual image.

When the curved screen 8 has a cylindrical shape with a curvature in the lengthwise direction, field curvature in the lengthwise direction, which is large due to a wide angle of view, can be effectively reduced.

When the curved screen 8 has a toroidal shape with curvatures in the lengthwise direction and in the crosswise direction, field curvature in the lengthwise direction and in the crosswise direction can be reduced.

When the curved screen 8 has a spherical shape, field curvature in the lengthwise direction and in the crosswise direction can be reduced.

When the curved screen 8 has a freeform surface shape, field curvature of the entire virtual image can be reduced.

Because the front windshield 10 is tilted relative to the horizontal plane and curved, light outgoing from the center of the intermediate image impinges on the concave mirror 9 at a position other than the center of the concave mirror 9.

This configuration enables the image display device 1000 to effectively correct distortion of a virtual image caused by tilt and curve of the front windshield 10.

Tilt and shape of the front windshield 10 vary from one vehicle type to another. More particularly, whereas some type has considerably small tilt and curvature, some other type has considerably large tilt and curvature. However, irrespective of the magnitude of the tilt and curve, the image display device 1000 can reduce distortion of the virtual image by adjusting the design of the concave mirror 9 and an incident position (which may be minutely decentered) on the concave mirror 9 of light having formed the center of the intermediate image.

Hence, an operator of the movable body (e.g., a vehicle), on which the image display device 1000 is mounted, can view information (virtual image) formed by the image display device immediately and reliably without experiencing difficulty.

Figure 9:
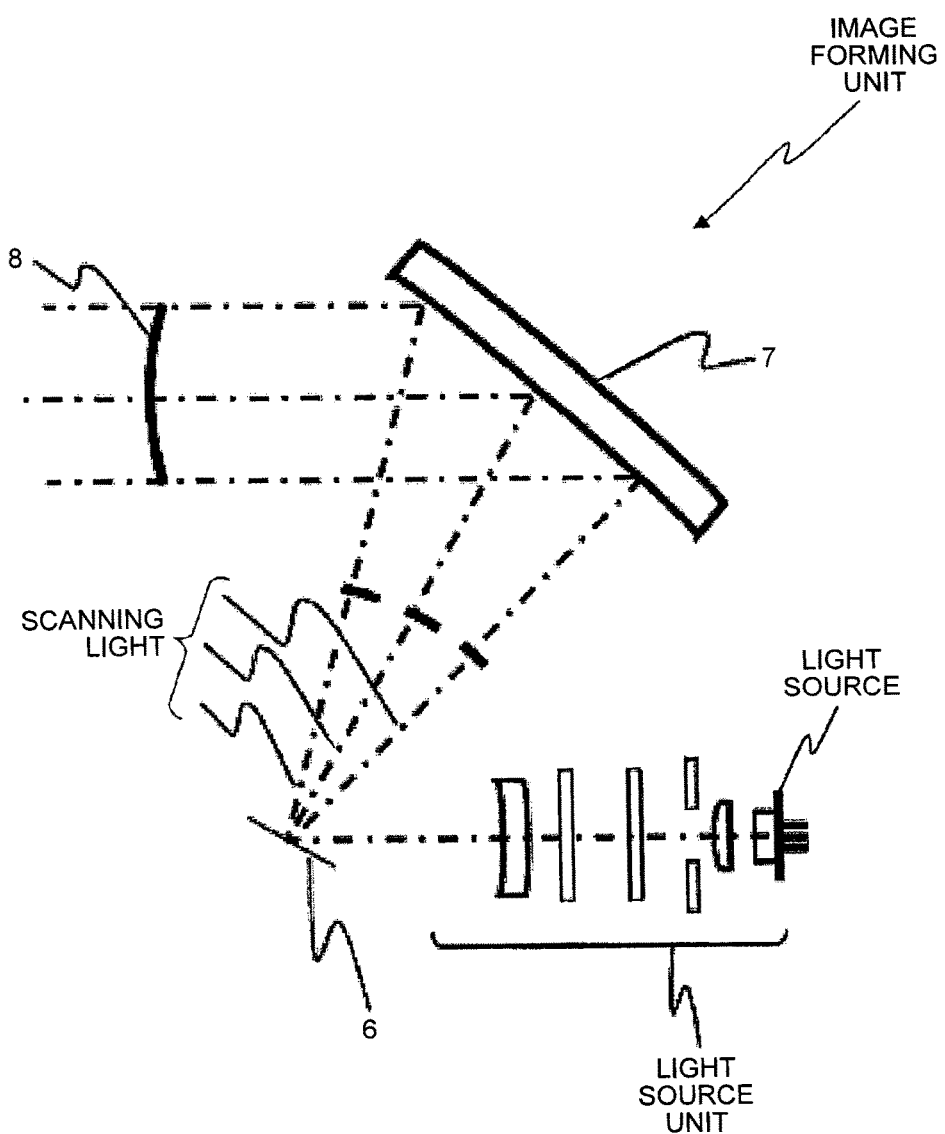
FIG. 9 is an explanatory diagram of a second modification of an image forming unit.

In the embodiment described above, a color image is formed using the plurality of light sources. Alternatively, a monochrome image may be formed using a single light source as is the image forming unit of the first modification illustrated in FIG. 11 and a second modification illustrated in FIG. 9. The image forming unit of the first modification illustrated in FIG. 11 may include a light source unit, similar to that included in the image display device 1000, capable of forming a color image.

Although the convex microlens structure (microlens array) curved as a whole is used as the curved screen in each of the embodiment and the modifications described above, the curved screen is not limited thereto. A curved transparent plate, a curved reflection plate, a curved diffuser plate, or the like may alternatively be used as the curved screen.

Note that the curved screen is more preferably of "transparent type" than "reflection type"

Although the plurality of microlenses are three-dimensionally arrayed along a virtual curved surface to form the microlens array in each of the embodiment and the modifications described above, the microlenses may alternatively be two-dimensionally arrayed along a virtual curved line.

Although an image is formed by two-dimensionally scanning the screen using the two-dimensional deflector in each of the embodiment and the modifications described above, an image may alternatively be formed by one-dimensionally scanning the screen using a one-dimensional deflector including a MEMS mirror, a galvano mirror, a polygon mirror, or the like, for example.

Although the LD (edge-emitting laser) is used as the light source in the embodiment and the modifications, the light source is not limited thereto. A VCSEL (vertical-cavity surface-emitting laser), an LED (light-emitting diode), an organic electroluminescent device, a lamp, or a laser other than semiconductor lasers may alternatively be used as the light source. The optical system for relaying light emitted from the light source to the curved screen 8 can be modified as appropriate.

In the embodiment and the second modification, a plane mirror can be used in lieu of the concave mirror 7.

Although the image forming unit includes the light source unit, the two-dimensional deflector 6, and the curved screen 8 (curved transparent member) in the embodiment and the modifications, configuration of the image forming unit is not limited thereto. For example, as a third modification, the image forming unit may include an image forming device (imaging device), such as a transmissive liquid crystal panel, reflective liquid crystal panel, or DMD (digital micromirror device) panel, and a light source. In short, the image forming device may be of either a transmissive type or a reflective type. The light source may include, for example, a cold-cathode fluorescent tube, a lamp, an LED, an organic electroluminescent device, a semiconductor laser (such as an LD or VCSEL), or a laser other than semiconductor lasers. The imaging device may be either an imaging device for forming a color image or that for forming a monochrome image.

When such an image forming device as that described above is used in lieu of the screen, the liquid crystal panel or the DMD panel may be flat as a whole. However, it is preferable that the liquid crystal panel or the DMD panel have a curved structure bulging toward the concave mirror 9 as a whole as does the curved screen 8 of the embodiment and the modifications. For example, the image forming device having the curved structure may have, as a whole, a shape similar to that of the curved screen 8 and be arranged such that the lengthwise direction and the crosswise direction coincide with the lateral direction and the longitudinal direction, respectively.

More specifically, the image forming device may be an image display panel (e.g., a liquid crystal panel) including a plurality of display units (e.g., liquid crystal), which correspond to a plurality of pixels in image data, arranged (along a virtual curved surface) so as to form the curved structure as a whole. The image forming device may alternatively be a digital micromirror device (i.e., a DMD panel) including a plurality of micromirrors, which correspond to the plurality of pixels in image data, arranged (along the virtual curved surface) so as to form the curved structure as a whole. Note that when the image forming device is configured to have the curved structure, as in the case of the curved screen described above, it is preferable that the image forming device be of "transparent type" than "reflection type".

Also when the image forming device having the curved structure is used in lieu of the curved screen, Expression (1) described above is preferably satisfied. When satisfied, advantages similar to those of the embodiment and the first and second modifications can be obtained as well. However, in this case, L in Expression (1) is the optical length of light, outgoing from center of an image on the image forming device and incident on the concave mirror 9, from the center of the image to the concave mirror 9; and if the image forming device has a cylindrical shape with a curvature in any one of the lengthwise direction and the crosswise direction, R is the curvature radius of the image forming device in the one of the lengthwise direction and the crosswise direction, if the image forming device has a toroidal shape with a curvature in the lengthwise direction, R is the curvature radius of the image forming device in the lengthwise direction, if the image forming device has a spherical shape with a uniform curvature, R is the curvature radius of the image forming device.

Also when the image forming device having the curved structure is used in lieu of the curved screen, Expression (2) described above is preferably satisfied. When satisfied, advantages similar to those of the embodiment and the first and second modifications can be obtained as well. In this case, $\beta$ in Expression (2) is a value obtained by dividing the length in the "a" direction (i.e., the lateral direction) of the virtual image viewed through the front windshield 10 by the length in the "a" direction (i.e., the lateral direction) of the intermediate image (image); and if the image forming device has a cylindrical shape with a curvature in any one of the lengthwise direction and the crosswise direction, R is the curvature radius in millimeters of the image forming device in the one of the lengthwise direction and the crosswise direction, if the image forming device has a toroidal shape with a curvature in the lengthwise direction, R is the curvature radius in millimeters of the image forming device in the lengthwise direction, if the image forming device has a spherical shape with a uniform curvature, R is the curvature radius in millimeters of the image forming device.

Also when the image forming device having the curved structure is used in lieu of the curved screen, Expression (3) described above is preferably satisfied. When satisfied, advantages similar to those of the embodiment and the first and second modifications can be obtained as well. In this case, a in Expression (3) is a value obtained by dividing the length in the "b" direction (i.e., the longitudinal direction) of the virtual image viewed through the front windshield 10 by the length in the "b" direction (i.e., the longitudinal direction) of the intermediate image; and if the image forming device has a cylindrical shape with a curvature in any one of the lengthwise direction and the crosswise direction, R is the curvature radius in millimeters of the image forming device in the one of the lengthwise direction and the crosswise direction, if the image forming device has a toroidal shape with a curvature in the lengthwise direction, R is the curvature radius in millimeters of the image forming device in the lengthwise direction, if the image forming device has a spherical shape with a uniform curvature, R is the curvature radius in millimeters of the image forming device.

Also when the image forming device having the curved structure is used in lieu of the curved screen, Expression (4) described above is preferably satisfied. When satisfied, advantages similar to those of the embodiment and the first and second modifications can be obtained as well. In this case, Limg in Expression (4) is the distance from a point of view of an observer viewing the virtual image of the intermediate image formed on the curved screen 8 through the front windshield 10 to the virtual image; and if the image forming device has a cylindrical shape with a curvature in any one of the lengthwise direction and the crosswise direction, R is the curvature radius of the image forming device in the one of the lengthwise direction and the crosswise direction, if the image forming device has a toroidal shape with a curvature in the lengthwise direction, R is the curvature radius of the image forming device in the lengthwise direction, if the image forming device has a spherical shape with a uniform curvature, R is the curvature radius of the image forming device.

Also when the image forming device having the curved structure is used in lieu of the curved screen, Expression (5) described above is preferably satisfied. When satisfied, advantages similar to those of the embodiment and the first and second modifications can be obtained as well. In this case, when the image forming device has a toroidal shape with curvatures varying between the lengthwise direction and the crosswise direction, R is the curvature radius of the image forming device in the lengthwise direction, and R' is the curvature radius of the same in the crosswise direction.

When the image forming device is used in lieu of the screen, a configuration, in which light outgoing from center of an image on the image forming device is caused to impinge on the concave mirror 9 at a position other than the center of the concave mirror 9, may be adopted. With this configuration, the image forming device can correct distortion even when the image forming device has a flat shape as a whole. However, if the liquid crystal panel or the DMD panel has the curved structure bulging toward the concave mirror 9, the image forming device can correct both of field curvature and distortion.

In the embodiment and the modifications, light outgoing from the center of the image on the curved structure (which is the curved screen or the curved imaging device) is caused to impinge on the concave mirror 9 at a position other than the center of the concave mirror 9. Alternatively, a configuration, in which the light is caused to impinge (non-eccentrically impinge) on the center of the concave mirror 9, may be adopted.

In the embodiment and the modifications, although the intermediate image on the curved structure has the shape formed by bending a rectangle, the shape is not limited thereto. The intermediate image may alternatively have a shape formed by bending a circle or an oval, a shape formed by bending a parallelogram, other than rectangles, such as a square, or a shape formed by bending a polygon whose number of sides is five or larger.

When the embodiment or one of the modifications is configured to cause light to eccentrically impinge on the concave mirror 9, a flat screen may be used in lieu of the curved screen. The flat screen may be of either a transparent type or a reflection type. Specific examples of the flat screen include a flat microlens array, a flat transparent plate, a flat reflection plate, and a flat diffuser plate.

When the embodiment or one of the modifications is configured to cause light to eccentrically impinge on the concave mirror 9, the value of R/L may fall out of the range defined by Expression (1) described above.

When the embodiment or one of the modifications is configured to cause light to eccentrically impinge on the concave mirror 9, the value of $\beta$/R may fall out of the range defined by Expression (2) described above.

When the embodiment or one of the modifications is configured to cause light to eccentrically impinge on the concave mirror 9, the value of $\alpha$/R may fall out of the range defined by Expression (3) described above.

When the embodiment or one of the modifications is configured to cause light to eccentrically impinge on the concave mirror 9, the value of R/Limg may fall out of the range defined by Expression (4) described above.

When the embodiment or one of the modifications is configured to cause light to eccentrically impinge on the concave mirror 9, the value of R/R' may fall out of the range defined by Expression (5) described above.

Although a freeform surface mirror with curvature distribution is used as the concave mirror 9 in each of the embodiment and the modifications, alternatively, a concave mirror with a uniform curvature may be used.

The transparent reflecting member is not limited to a windshield of a movable body. Alternatively, the transparent reflecting member may be other window member that enables an occupant(s) (e.g., an operator, a navigator, a crew, or a passenger) of the movable body to view outside of the movable body. Examples of the other window member include a side glass and a rear glass. The transparent reflecting member is not necessarily made of glass, but may alternatively be made of a resin, for example.

The transparent reflecting member may be a member, such as what is referred to as a combiner, independent of the window member (e.g., a front windshield) of the movable body and arranged on a near side relative to the window member as viewed from an observer. Also in this case, it is preferable to adjust design of the concave mirror 9, eccentric incidence on the concave mirror 9, the curvature radius of the screen, positional relationship between the screen and the concave mirror 9, and the like depending on shape and tilt of the transparent reflecting member.

The transparent reflecting member does not necessarily satisfy both a condition that the transparent reflecting member is tilted relative to the horizontal plane and a condition that the transparent reflecting member is curved, but may instead satisfy only one of the conditions. For example, the transparent reflecting member may be a flat member tilted relative to the horizontal plane or a curved member perpendicular to the horizontal plane.

In the description of the embodiment and the modifications, the exemplary image display device is mounted on a movable body such as a vehicle, aircraft, or ship. However, the image display device is not necessarily configured to be mounted on a movable body but may be configured to be mounted on a body. An apparatus including a body and an image forming device mounted on the body can provide advantages similar to those of the embodiment and the modifications. In this case, the image display device may or may not include the transparent reflecting member as its constituent. Examples of the "body" include not only a movable body but also a fixedly-installed body or a portable body.

Embodiments of the image display device according to the present invention are not limited to those mounted on a body. For example, the image display device can be embodied as an independent image display device or an image display device mountable on a human body (e.g., a head-mount display). The image display device may be embodied as an image display device for use in movie viewing.

According to an aspect of the present invention, visibility of a virtual image can be increased without involving device upsizing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image display device comprising:
   an image forming unit configured to emit light forming an image; and
   a concave mirror configured to reflect the light emitted from the image forming unit toward a transparent reflecting member,
   wherein the image forming unit includes a transparent member on which the image is formed or which forms the image, the transparent member being curved bulging toward the concave mirror and including a cylindrical shape with a curvature in a lengthwise direction or a crosswise direction.

2. The image display device according to claim 1, wherein:

$$0.15 \leq R/L \leq 2.0$$

is satisfied, where L is an optical length of light between center of an intermediate image formed on the transparent member and the concave mirror, the light outgoing from the center of the intermediate image and incident on the concave mirror, R is a curvature radius of the transparent member in one of the lengthwise direction and the crosswise direction.

3. The image display device according to claim 1, wherein:

$$0.01 \leq \beta/R \leq 0.7$$

is satisfied, where $\beta$ is a value obtained by dividing a length in lateral direction of a virtual image viewed through the transparent reflecting member by a length in the lateral direction of the image, R is a curvature radius of the transparent member in one of the lengthwise direction and the crosswise direction.

4. The image display device according to claim 1, wherein:

$$0.01 \leq \alpha/R \leq 0.7$$

is satisfied, where $\alpha$ is a value obtained by dividing a length in longitudinal direction of a virtual image viewed through the transparent reflecting member by a length in the longitudinal direction of the image, R is a curvature radius of the transparent member in one of the lengthwise direction and the crosswise direction.

5. The image display device according to claim 1, wherein:

$$0.005 \leq R/Limg \leq 0.15$$

is satisfied, where Limg is a distance from a point of view of an observer viewing a virtual image of the image formed on the transparent member through the transparent reflecting member to the virtual image, R is a curvature radius of the transparent member in one of the lengthwise direction and the crosswise direction.

6. The image display device according to claim 1, wherein the transparent member has the curvature in the lengthwise direction.

7. The image display device according to claim 1, wherein the transparent member is a microlens array.

8. The image display device according to claim 1, wherein light outgoing from center of the image impinges on the concave mirror at a position other than center of the concave mirror.

9. The image display device according to claim 1, wherein the image forming unit further includes:
   a light source unit configured to emit light in accordance with image data,
   an optical scanning system including a deflector configured to scan the transparent member with the light emitted from the light source unit, and
   no optical member between the deflector and the transparent member.

10. The image display device according to claim 1, wherein the transparent reflecting member includes a window member of a movable body.

11. The image display device according to claim 1, further comprising the transparent reflecting member.

12. An apparatus comprising:
    the image display device according to claim 1; and
    a body in which the image display device is mounted.

13. An image display device comprising:
    an image forming unit configured to emit light forming an image; and
    a concave mirror configured to reflect the light emitted from the image forming unit toward a transparent reflecting member,
    wherein the image forming unit includes a transparent member on which the image is formed or which forms the image, the transparent member being curved bulging toward the concave mirror and including a toroidal shape with a curvature in a lengthwise direction.

14. The image display device according to claim 13, wherein:
    the transparent member further has a curvature in a crosswise direction, satisfying $$0.8 \leq R/R' \leq 2.2$$

where R is a curvature radius of the transparent member in the lengthwise direction, and R' is a curvature radius of the transparent member in the crosswise direction.

15. The image display device according to claim 13, wherein:

$$0.15 \leq R/L \leq 2.0$$

is satisfied, where L is an optical length of light between center of an intermediate image formed on the transparent member and the concave mirror, the light outgoing from the center of the intermediate image and incident on the concave mirror, and R is a curvature radius of the transparent member in the lengthwise direction.

16. The image display device according to claim 13, wherein:

$$0.01 \leq \beta/R \leq 0.7$$

is satisfied, where β is a value obtained by dividing a length in lateral direction of a virtual image viewed through the transparent reflecting member by a length in the lateral direction of the image, and R is a curvature radius of the transparent member in the lengthwise direction.

17. The image display device according to claim 13, wherein:

$$0.01 \leq \alpha/R \leq 0.7$$

is satisfied, where α is a value obtained by dividing a length in longitudinal direction of a virtual image viewed through the transparent reflecting member by a length in the longitudinal direction of the image, and R is a curvature radius of the transparent member in the lengthwise direction.

18. The image display device according to claim 13, wherein:

$$0.005 \leq R/Limg \leq 0.15$$

is satisfied, where Limg is a distance from a point of view of an observer viewing a virtual image of the image formed on the transparent member through the transparent reflecting member to the virtual image, and R is a curvature radius of the transparent member in lengthwise direction.

19. The image display device according to claim 13, wherein the transparent member is a microlens array.

20. An image display device comprising:
 an image forming unit configured to emit light forming an image; and
 a concave mirror configured to reflect the light emitted from the image forming unit toward a transparent reflecting member,
 wherein the image forming unit includes a transparent member on which the image is formed or which forms the image, the transparent member being curved bulging toward the concave mirror and including a freeform surface shape.

* * * * *